(12) United States Patent
Michielin et al.

(10) Patent No.: US 11,210,804 B2
(45) Date of Patent: Dec. 28, 2021

(54) METHODS, DEVICES AND COMPUTER PROGRAM PRODUCTS FOR GLOBAL BUNDLE ADJUSTMENT OF 3D IMAGES

(71) Applicant: SONY GROUP CORPORATION, Tokyo (JP)

(72) Inventors: Francesco Michielin, Stuttgart (DE); Roderick Köehle, Munich (DE); Sebastian Farås, Malmö (SE); Fredrik Mattisson, Lund (SE)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 16/960,628

(22) PCT Filed: Feb. 23, 2018

(86) PCT No.: PCT/US2018/019334
§ 371 (c)(1),
(2) Date: Jul. 8, 2020

(87) PCT Pub. No.: WO2019/164498
PCT Pub. Date: Aug. 29, 2019

(65) Prior Publication Data
US 2020/0334842 A1    Oct. 22, 2020

(51) Int. Cl.
*G06T 7/579* (2017.01)
*G06T 7/70* (2017.01)
*G06T 15/10* (2011.01)

(52) U.S. Cl.
CPC .............. *G06T 7/579* (2017.01); *G06T 7/70* (2017.01); *G06T 15/10* (2013.01);
(Continued)

(58) Field of Classification Search
CPC ................................ G06T 7/246; G06T 7/579
See application file for complete search history.

(56) References Cited

U.S. PATENT DOCUMENTS 6,263,096 B1 *  7/2001  Boag ..................... G06T 11/001
                                                                378/65
9,551,579 B1 *  1/2017  Sheridan ................... G06T 7/38
(Continued)

OTHER PUBLICATIONS

International Search Report and Written Opinion of the International Searching Authority, International Application No. PCT/US2018/019334, dated Sep. 20, 2018, 15 pp.
(Continued)

*Primary Examiner* — Phi Hoang
(74) *Attorney, Agent, or Firm* — Myers Bigel, P.A.

(57) ABSTRACT

A method for estimating a 3D map is described. The method includes performing an initialization of a plurality of 3D points in the 3D map based on the plurality of 2D images, reprojecting ones of the 3D points onto ones of the 2D images to obtain reprojection points, determining respective reprojection errors of ones of the reprojection points, determining a robust camera parameter associated with a weighting function based on the respective reprojection errors, and performing bundle adjustment to update the 3D map and update the plurality of poses, based on the robust camera parameter and the weighting function. Related systems, devices and computer program products are also described.

17 Claims, 18 Drawing Sheets

(52) U.S. Cl.
CPC .............................. *G06T 2200/04* (2013.01);
*G06T 2207/30201* (2013.01); *G06T 2207/30244* (2013.01)

(56) References Cited

U.S. PATENT DOCUMENTS

| | | | | |
|---|---|---|---|---|
| 2014/0029819 | A1* | 1/2014 | Zeng | G06T 11/006 382/131 |
| 2015/0172626 | A1* | 6/2015 | Martini | G06K 9/46 348/50 |
| 2016/0086336 | A1* | 3/2016 | Lin | H04N 13/282 348/50 |
| 2018/0120932 | A1* | 5/2018 | Sengelaub | G06K 9/00604 |
| 2020/0020073 | A1* | 1/2020 | Blikas | G06T 7/70 |
| 2020/0334841 | A1* | 10/2020 | Cristobal | G06T 7/579 |

OTHER PUBLICATIONS

Cao et al., "Robust bundle adjustment for large-scale structure from motion", Multimedia Tools and Applications, vol. 76, No. 21, Apr. 1, 2017, pp. 21843-21867.

Tamaazousti et al, "The constrained SLAM framework for non-instrumented augmented reality", Multimedia Tools and Applications, vol. 75, No. 16, Oct. 19, 2015, pp. 9511-9547.

Sünderhauf et al., "Visual Odometry Using Sparse Bundle Adjustment on an Autonomous Outdoor Vehicle", In "Autonome Mobile Systeme 2005—19. Fachgespräch Stuttgart, 8./9. Dec. 2005", Springer Verlag, Berlin, DE, Jan. 1, 2006, pp. 157-163.

Ma et al., "Efficient outlier removal in vision based navigation", Proceedings of the 2012 IEEE/ION Position, Location and Navigation Symposium, Myrtle Beach, SC, Apr. 23-26, 2012, pp. 506-511.

Agamennoni et al., "Self-tuning M-estimators," 2015 IEEE International Conference on Robotics and Automation (ICRA), Seattle, WA, May 26-30, 2015, pp. 4628-4635.

Ruckstuhl, "Robust Fitting of Parametric Models Based on M-Estimation", Jan. 1, 2016, Retrieved from the Internet: URL:https://ethz.ch/content/dam/ethz/special-interest/math/statistics/sfs/Education/Advanced%20Studies%20in%20Applied%20Statistics/course-material/robust-nonlinear/robstat16E.pdf [retrieved on Sep. 6, 2018], 64 pp.

* cited by examiner

METHODS, DEVICES AND COMPUTER PROGRAM PRODUCTS FOR GLOBAL BUNDLE ADJUSTMENT OF 3D IMAGES

CROSS REFERENCE TO RELATED APPLICATION

This application is a 35 U.S.C. § 371 national stage application of PCT International Application No. PCT/US2018/019334, filed on Feb. 23, 2018, the content of which is incorporated herein by reference in its entirety. The above-referenced PCT International Application was published in the English language as International Publication No. WO 2019/164498 A1 on Aug. 29, 2019.

FIELD

Various embodiments described herein relate to methods and devices for image processing and more particularly to creating 3D images.

BACKGROUND

Simultaneous Localization and Mapping (SLAM) relates to constructing or updating a map of an image while a user's location is non-static in the environment. In mono-camera systems, image-based positioning algorithms may use SLAM techniques to create Three-Dimensional (3D) images for augmented reality, 3D printing, 3D model development, and other applications. SLAM techniques utilize the construction of a 3D map from Two-Dimensional (2D) images. A 3D map may be generated from a series of 2D images, which can allow the generation of a 3D model from a series of scanned images. Developing a 3D map may be based on various poses of the object in the 2D images, which may be a challenging, computationally intensive task.

SUMMARY

Applications such as 3D imaging, mapping, and navigation may construct or update a 3D map while simultaneously keeping track of an object's location within it and/or estimating the pose of the camera with respect to the object or scene. This computational problem is complex since the object may be moving and the environment may be changing. Image processing systems may perform 3D pose estimation using SLAM techniques by performing a transformation of an object in a 2D image to produce a 3D object. However, existing techniques may be insufficient in accurately estimating and positioning various points in a 3D object based on information discerned from 2D images and may be computationally inefficient in real time. Advantageously, various embodiments described herein may arise from a recognition that accurately estimating various points in a 3D map may be important for 3D image generation. A joint relation of the 3D map and the position and/or orientation of the camera may form a transformation from the 3D map to the 2D image. It may be possible to reproject a 3D point of the 3D map into the image frame to advantageously improve the 3D map and/or estimates of poses.

Various embodiments described herein provide a method for estimation of a Three-Dimensional, 3D, map and a plurality of poses from a plurality of Two-Dimensional, 2D, images. The method includes performing an initialization of a plurality of 3D points in the 3D map based on the plurality of 2D images, reprojecting ones of the 3D points onto ones of the 2D images to obtain reprojection points, determining respective reprojection errors of ones of the reprojection points, determining a robust statistic parameter associated with a weighting function based on the respective reprojection errors, and performing bundle adjustment to update the 3D map and/or update the plurality of poses, based on the robust statistic parameter and the weighting function.

In some embodiments, performing bundle adjustment may include iteratively updating the 3D map and the plurality of poses based on updated reprojection errors and an updated robust statistic parameter associated with an updated weighting function. The updated robust statistic parameter for a current iteration of the bundle adjustment may be different from the robust statistic parameter for a previous iteration of the bundle adjustment. The updated robust statistic parameter may be reduced with subsequent iterations of the bundle adjustment.

In some embodiments, reprojecting ones of the 3D points may be a first reprojection and the bundle adjustment may be a first bundle adjustment. Iteratively updating the 3D map and the plurality of poses may include performing a second reprojection by reprojecting the ones of updated 3D points onto ones of the 2D images to obtain updated reprojection points, determining respective updated reprojection errors of ones of the updated reprojection points, determining the updated robust statistic parameter associated with the updated weighting function based on the respective updated reprojection errors, and performing a second bundle adjustment to update the 3D map and update the plurality of poses, based on the updated robust statistic parameter and the updated weighting function. The method may include reducing 3D drift in the 3D map and/or the plurality of poses based on iteratively updating the 3D map and the plurality of poses.

In some embodiments, performing the initialization of the plurality of 3D points in the 3D map may include determining respective poses of the plurality of poses for ones of the plurality of 2D images. Performing the initialization of the plurality of 3D points in the 3D map may include selectively determining that a 2D image of the plurality of 2D images is a key frame of a plurality of key frames. Selectively determining that the 2D image of the plurality of 2D images is the key frame may include determining that the 2D image of the plurality of 2D images is the key frame, responsive to a change in a pose from another 2D image of the plurality of 2D images being greater than an angle threshold. Performing bundle adjustment may include performing bundle adjustment on the plurality of key frames of the plurality of 2D images to update the 3D map and update the plurality of poses. The respective reprojection errors may include respective distances of respective reprojection points to corresponding 2D points in ones of the 2D images.

In some embodiments, the method may include determining a change in steepness of a curve corresponding to the reprojection errors and/or a median and/or mean reprojection error of the reprojection errors of the reprojection points, and determining the robust statistic parameter based on the change in steepness of the curve corresponding to the reprojection errors and/or a scaling of the median and/or mean reprojection error. The weighting function selectively provides a greater weight to a second one of the reprojection points than to a first one of the reprojection points, responsive to a first reprojection error associated with the first one of the reprojection points being greater than a second reprojection error associated with the second one of the reprojection points. The method may include minimizing a sum of the reprojection errors of the reprojection points based on the performing bundle adjustment. The weighting function may be a quadratic function for first ones of the reprojection errors that are less than a threshold reprojection error, and the weighting function may be a linear function for second ones of the reprojection errors that are greater than the threshold reprojection error. The method may include receiving the 2D images from a camera.

Some embodiments are directed to a computer program product for operating an image capturing system, the computer program product comprising a non-transitory computer readable storage medium having computer readable program code embodied in the medium that when executed by a processor causes the processor to perform the method of any of the operations described herein.

Some embodiments are directed to an imaging system for processing images. The imaging system includes a processor and a memory coupled to the processor and storing computer readable program code that when executed by the processor causes the processor to perform operations including performing an initialization of a plurality of 3D points in the 3D map based on the plurality of 2D images, reprojecting ones of the 3D points onto ones of the 2D images to obtain reprojection points, determining respective reprojection errors of ones of the reprojection points, determining a robust statistic parameter associated with a weighting function based on the respective reprojection errors, and performing bundle adjustment to update the 3D map and update the plurality of poses, based on the robust statistic parameter and the weighting function.

In some embodiments, performing bundle adjustment may include iteratively updating the 3D map and the plurality of poses based on updated reprojection errors and an updated robust statistic parameter associated with an updated weighting function. The updated robust statistic parameter for a current iteration of the bundle adjustment may be different from the robust statistic parameter for a previous iteration of the bundle adjustment.

It is noted that aspects of the inventive concepts described with respect to one embodiment, may be incorporated in a different embodiment although not specifically described relative thereto. That is, all embodiments and/or features of any embodiment can be combined in any way and/or combination. Other operations according to any of the embodiments described herein may also be performed. These and other aspects of the inventive concepts are described in detail in the specification set forth below.

DETAILED DESCRIPTION

Figure 1:
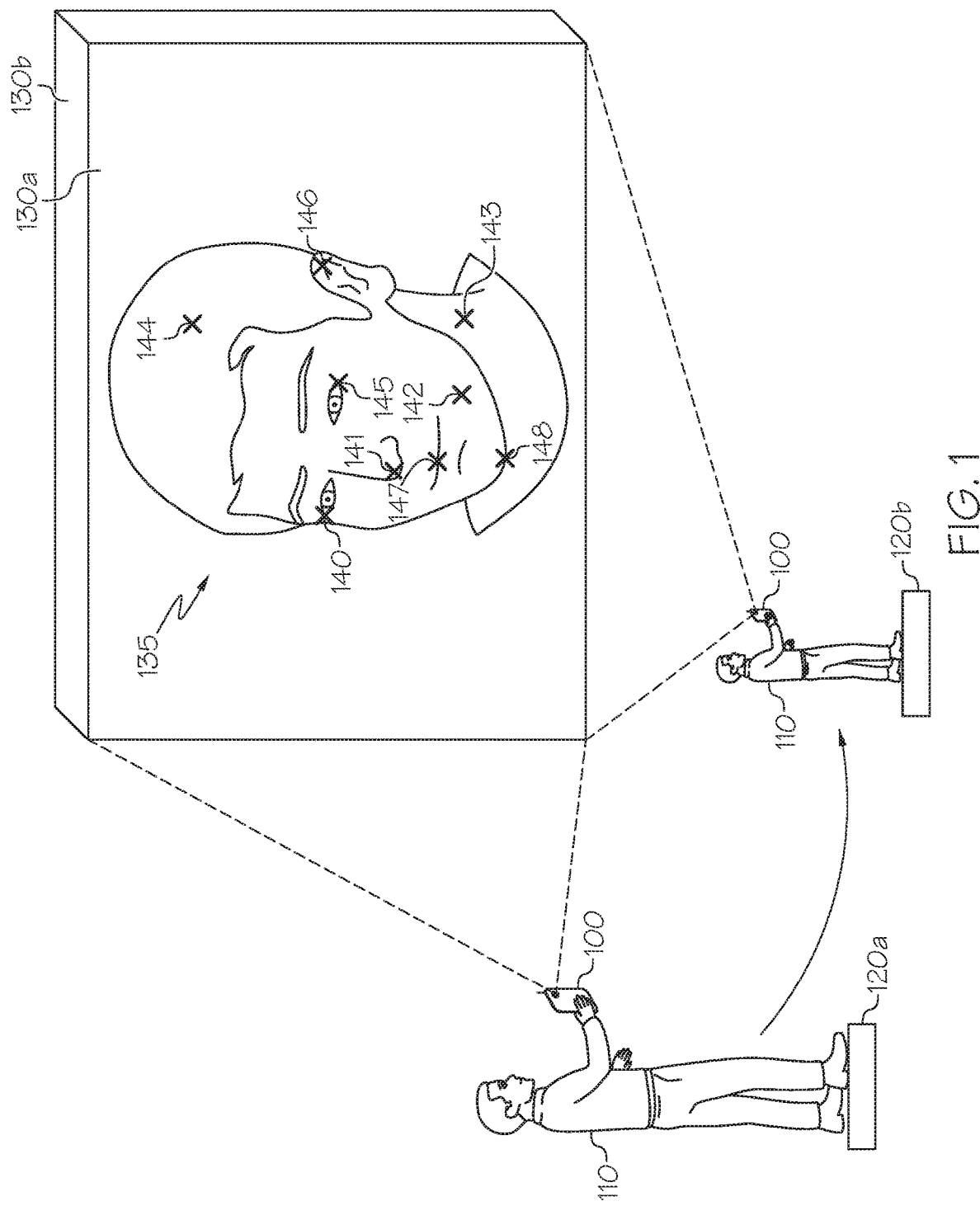
FIG. 1 illustrates a user taking pictures with a camera, according to various embodiments described herein.

Various embodiments will be described more fully hereinafter with reference to the accompanying drawings. Other embodiments may take many different forms and should not be construed as limited to the embodiments set forth herein. Like numbers refer to like elements throughout.

Applications such as 3D imaging, mapping, and navigation may use Simultaneous Localization and Mapping (SLAM). SLAM relates to constructing or updating a map of an unknown environment while simultaneously keeping track of an object's location within it and/or estimating the pose of the camera with respect to the object or scene. This computational problem is complex since the object may be moving and the environment may be changing. 2D images of real objects and/or 3D objects may be captured with the objective of creating a 3D image that is used in real-world applications such as augmented reality, 3D printing, and/or 3D visualization with different perspectives of the real objects. The 3D objects may be characterized by features that are specific locations on the physical object in the 2D images that are of importance for the 3D representation. There are several algorithms used for solving this computational problem associated with 3D imaging, using approximations in tractable time for certain environments. Popular approximate solution methods include the particle filter and Extended Kalman Filter (EKF). The particle filter, also known as a Sequential Monte Carlo (SMC) linearizes probabilistic estimates of data points. The Extended Kalman Filter is used in non-linear state estimation in applications including navigation systems such as Global Positioning Systems (GPS), self-driving cars, unmanned aerial vehicles, autonomous underwater vehicles, planetary rovers, newly emerging domestic robots, medical devices inside the human body, and/or image processing systems. Image processing systems may perform 3D pose estimation using SLAM techniques by performing a transformation of an object in a 2D image to produce a 3D object. However, existing techniques such as SMC and EKF may be insufficient in accurately estimating and positioning various points in a 3D object based on information discerned from 2D images and may be computationally inefficient in real time.

Various embodiments described herein may arise from a recognition that accurately estimating various points in a 3D map may be essential to 3D image generation. 3D image generation may include estimation of the position and/or orientation of the camera where the 2D image was captured. A joint relation of the 3D map and the position and/or orientation of the camera may form a transformation from the 3D map to the 2D image. It may be possible to reproject a 3D point of the 3D map into the image frame. Reprojecting the 3D point of the 3D map in the image frame may result in a reprojection error. This reprojection error may be expressed in pixels and correspond to a distance from the reprojected 3D point from the 3D map to the corresponding point position in the image.

Estimated camera positions may be continuously refined by using Bundle Adjustment (BA) techniques. Bundle adjustment may use frames and/or key frames that are selected based on changes in the pose/orientation of a subject in the 2D images. In some embodiments, if a given frame is selected as a key frame, global bundle adjustment (BA) may be used to refine the key-frames positions and/or to refine or triangulate new 3D points. In other words, bundle adjustment may be performed on any of the 2D images or frames captured, or on a subset of frames, such as the key frames, as will be further discussed with respect to FIG. 6 and/or FIGS. 21 to 23.

2D images may be obtained using image sensors. Image sensors may be collocated with or integrated with a camera, such as a camera in a mobile device. The terms "image capturing system" and "camera" will be used herein interchangeably. The image capture system may include an image sensor and/or camera optical elements. The image capture system may be implemented with integrated hardware and/or software as part of an electronic device, or as a separate device. Types of image capture systems may include mobile phone cameras, security cameras, wide-angle cameras, narrow-angle cameras, stereoscopic cameras, and/or monoscopic cameras.

FIG. 1 illustrates a user taking pictures with a camera at various locations around the object. Although the foregoing examples discuss the images acquired from a camera, the images that are processed may be previously residing in memory or the images be sent to the processing unit for processing according to various embodiments described herein. Furthermore, a face of a person is discussed herein as an example object, but the techniques described herein may apply to any object for which a 2D image can be acquired. Referring now to FIG. 1, a user 110 has a camera 100 for which they initiate a photographic session of an object 135, such as a person's face, at location 120*a*. Relative movement between the camera 100 and the object 135 takes place. In some embodiments, the user 110 may physically move around the object 135 to various locations such as from location 120*a* to location 120*b*. In other embodiments, the camera 100 may not move and the object 135 may move. In still other embodiments, both the camera 100 and the object 135 may move. Accordingly, as described herein, movement of a camera 100 around an object 135 shall encompass any relative movement between the camera 100 and the object 135. An image 130 of object 135 is captured at each location. For example, image 130*a* is captured when the camera 100 is at location 120*a* and image 130*b* is captured when camera 100 moves to location 120*b*. Each of the captured images may be 2D images. There may be a continuous flow of images from the camera as the user walks around the object 135 that is being photographed to capture images at various angles. Once at least two images, such as images 130*a* and 130*b* are captured, the images may be processed by a processor in camera 100 and/or a processor external to the camera 100 to produce a 3D map, a 3D representation, and/or a 3D image. Generation of the 3D map may occur after at least the first two images are captured. The quality of the 3D map may not be satisfactory if too few 2D images are used. If the quality of the 3D map is not sufficient, further processing of additional images may take place. In other words, additional 3D points based on information from additional 2D images may improve the quality of the 3D map. Information from the 3D points may be used to determine one or more poses. Information related to the poses may include orientation of the camera when capturing the image and/or a position of capture by the camera. The 3D map and/or the poses may be subsequently used to generate a 3D image that is provided for display on a display device and/or screen and/or for other purposes such as augmented reality, 3D printing, etc.

The images may be processed by identifying features or landmarks on the object 135 that were captured in the first image 130*a* and/or second image 130*b*. The landmarks may be various edges, corners, blobs, or other points on object 135 or object-specific features such as eyes 140,145, nose 141, dimple 142, neck 143, hair 144, ear 146, mouth 147, and/or chin 148. The features or landmarks may be recognizable locations on the physical object 135 that are tracked in various images of the physical object 135. When the user 110 moves the camera 100 to a different location 120*b*, another image 130*b* is captured. This same process of capturing images and identifying features or landmarks may occur on the order of tens, hundreds, or thousands of times in the context of creating a 3D image. The same features 140 through 148 may be identified in the second image 130*b*. An X-Y-Z coordinate system may be used to quantify the location of features 140 through 148. Continuing with the foregoing example of a person's face, differences in the facial features and/or facial orientation will be discussed with respect to FIGS. 3A to 3C.

Figure 2:
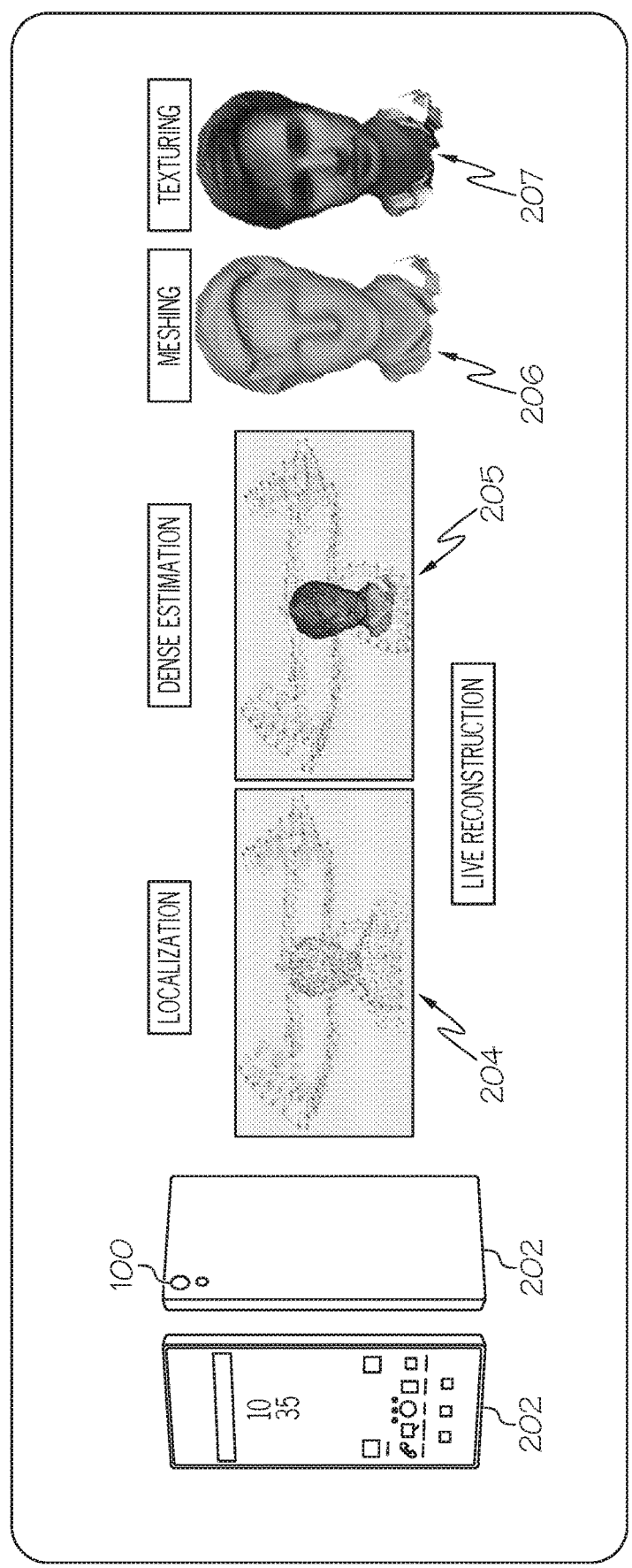
FIG. 2 illustrates image processing of 2D images from a camera, according to various embodiments described herein.

FIG. 2 illustrates image processing of 2D images from a camera to create a 3D image. Referring now to FIG. 2, a camera 100 that is part of a device 202 such as a mobile phone may capture 2D images. Converting 2D images into a 3D representation (also referred to herein as a 3D model) includes multiple, somewhat independent image processing operations, including localization 204, dense estimation 205, meshing 206, and/or texturing 207. Localization 204 may include 3D map and/or depth determination and pose determination. Pose determination may utilize Simultaneous Localization and Mapping (SLAM), including image-based positioning techniques, to track a location (including position and orientation) of the image capture device in an operating environment. 3D map determination may involve calculation of 3D coordinates or related information (e.g., X, Y, and/or Z coordinates) from a set of 2D images by identifying matching elements in two or more images and triangulating the positions of the matched elements in 3D space. Matching elements may include related 2D points that are present in two or more images that appear to be of similar structures in the 2D images. Multiple depth maps can be combined in meshing 206 to create an initial polygon mesh representation of a subject represented in the set of images. Meshing 206 may include sculpting to subdivide surfaces of the initial polygon mesh representation to derive adjusted locations and/or displacements for the vertex positions of some polygons, and storing the adjusted locations and/or displacements in an image map. The values of respective vertices of those polygons may thus be adjusted from their initial value, such that the sculpted model may iteratively define portions with an adjusted topology (representing additional detail) relative to the initial or previous polygon mesh representation. That is, after sculpting, the mesh representation may include vertices whose values have changed from the initial value, and vertices whose values have not changed from the initial value. Texturing 207 and other material application operations may involve applying colors from the original set of images to the 3D mesh representation, for example, by projecting the images onto the mesh and/or segments thereof. Operations for creating a 3D representation, such as those described above, may be collectively referred to herein as 3D scanning and may be used to construct a 3D image that is displayed on a user interface or other display device.

A scan may be based on the camera 100 making a continuous movement around an object. The camera 100 may move continuously around the object that it is capturing, thereby generating several frames or 2D images. The camera motion may include several camera poses. Each of the 2D images has a pose associated with it, which includes the orientation and position of capture by the camera 100 of the 2D image. The position of the pose associated with a given 2D image may be in relation to the first image captured by the camera 100 during the scan. For example, the first 2D image may be designated as having a position in a 3D space as being X coordinate=0, Y coordinate=0, and Z coordinate=0 and the orientation as being zero degrees from the normal from the object to the camera. Subsequent 2D images may have an orientation and position that is with respect to this first 2D image that was captured during the scan. Other techniques of defining the orientation and/or position of an image capturing device may also be used.

Figure 3A:
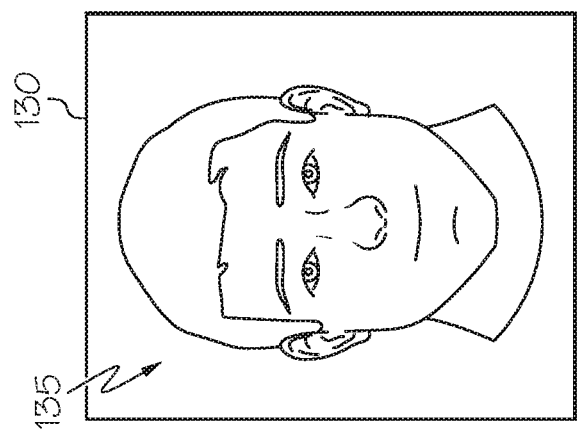
FIGS. 3A to 3C illustrate Two Dimensional (2D) images of a face, according to various embodiments described herein.
Figure 3B:
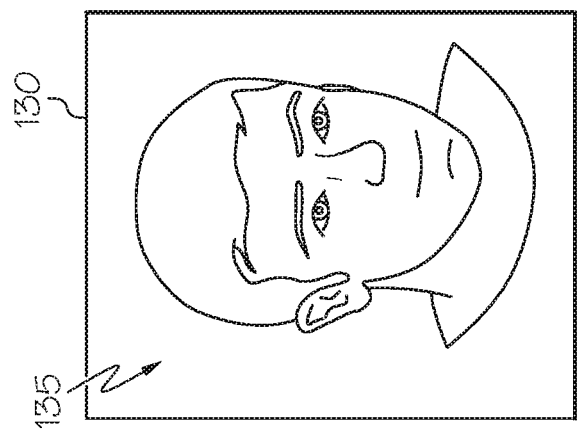
Figure 3C:
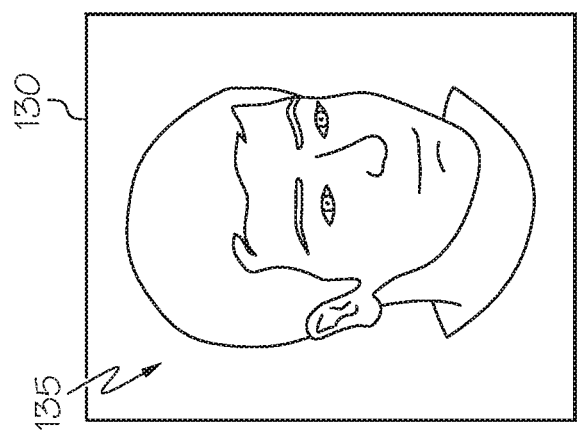

FIGS. 3A to 3C illustrate a person's face that is oriented in various directions. In other words, various poses are illustrated in FIGS. 3A to 3C. Referring now to FIG. 3A, the face is oriented straight at the camera 100. Referring now to FIG. 3B, the face is offset from the perpendicular by about 30 degrees. Referring now to FIG. 3C, the face is offset from the perpendicular by about 45 degrees. Techniques to determine the pose of these various facial angular orientations of the 2D images will now be discussed.

Localization 204 of FIG. 2 is used to determine a 3D map and/or poses, which may be important factors of creating a 3D representation. Some embodiments described herein arise from the recognition that, in image processing operations to create a 3D representation of a subject from images captured by an image capture device, the 3D representation may be degraded if the corresponding pose of the image capture device and/or a related 3D map cannot be accurately determined. Embodiments described herein are thus directed to using improved techniques to create and/or update a 3D map and/or determining accurate estimated poses of the image capture device.

More particularly, a robust and accurate method that can deliver real-time pose estimates and/or a 3D map for 3D reconstruction and provide enough information for camera calibration is described in various embodiments. Initialization of the 3D map or structure may be based on the scene or the scene structure that is discerned from a series of 2D images or frames. During the initialization phase, an initialization of the 3D map and the poses is used to localize the camera for 2D frames. An initial map of the scene, which is represented by a set of 3D coordinates corresponding to salient image points that are tracked between sequential frames, is constructed and the camera poses (orientation and position of the camera along its trajectory) are computed. Criteria, such as, for example, the number of tracked points or the pose change, are used to decide if the current frame should become a key-frame. Key frames are selected as representative sets of frames to be used in the localization. If a given frame is selected as a key frame, global bundle adjustment (BA) may be used to refine the key-frames positions and/or to refine or triangulate new 3D points. During this processing a global feature database may be created and populated with globally optimized landmarks. Each landmark may be associated with some stored information such as the related 3D coordinates, a list of frames/ key-frames where it was visible, and/or a reference patch. After the initialization phase, a set of anchor landmarks may be available when the sequential updating and/or tracking phase is entered.

Figure 4:
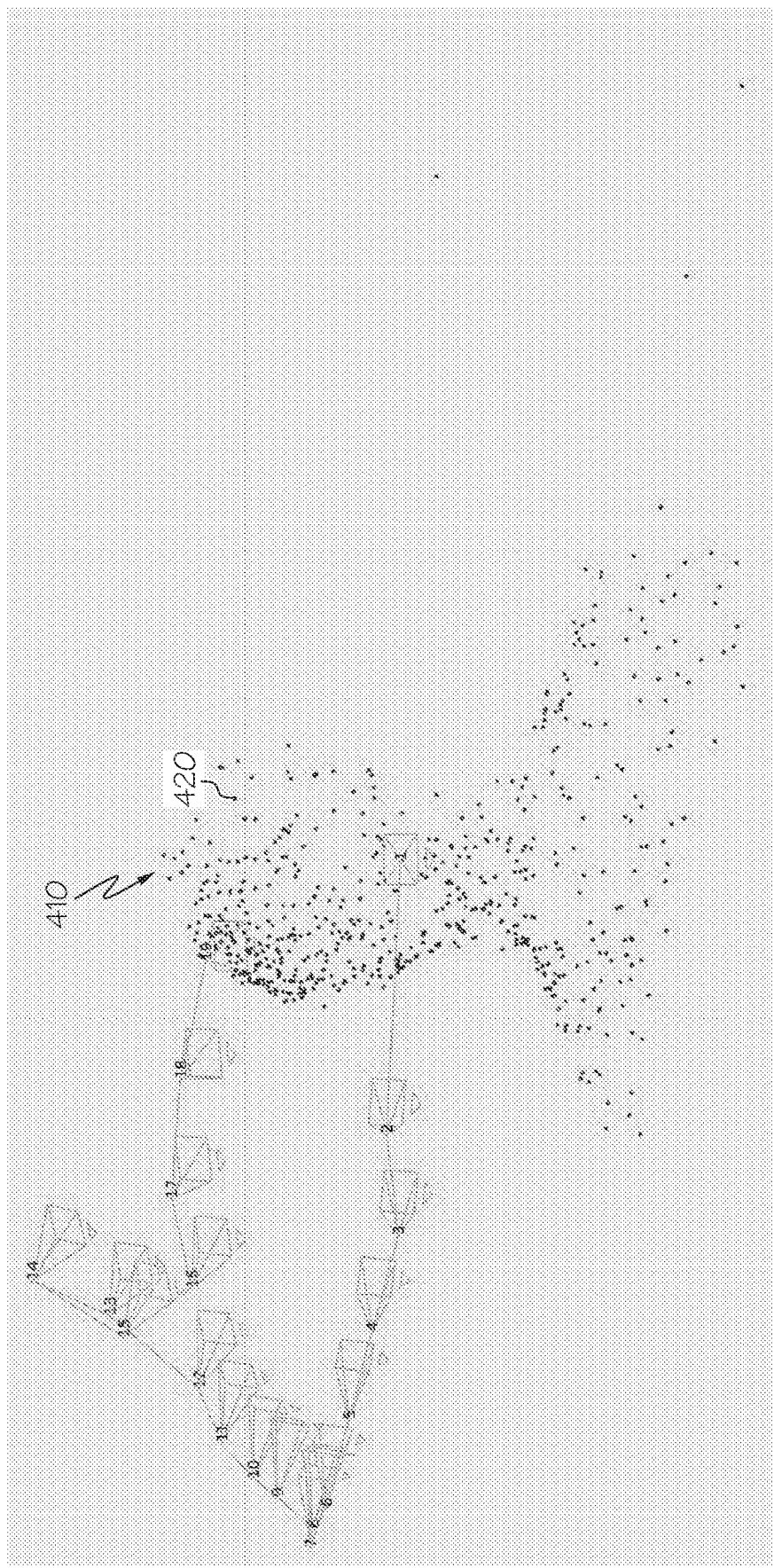
FIG. 4 illustrates localization of 3D images, according to various embodiments described herein.

FIG. 4 illustrates localization of 3D poses, corresponding to block 204 of FIG. 2. Referring now to FIG. 4, several 2D images of an object such as the face of a person have been collected during a portion of a scan. The poses 1 to 19 are estimated at various camera viewpoints of the 2D images. A 3D map 410 of the object including various 3D points 420 is constructed. The 3D map 410 includes 3D points 420 that have been triangulated from the 2D images.

Figure 5:
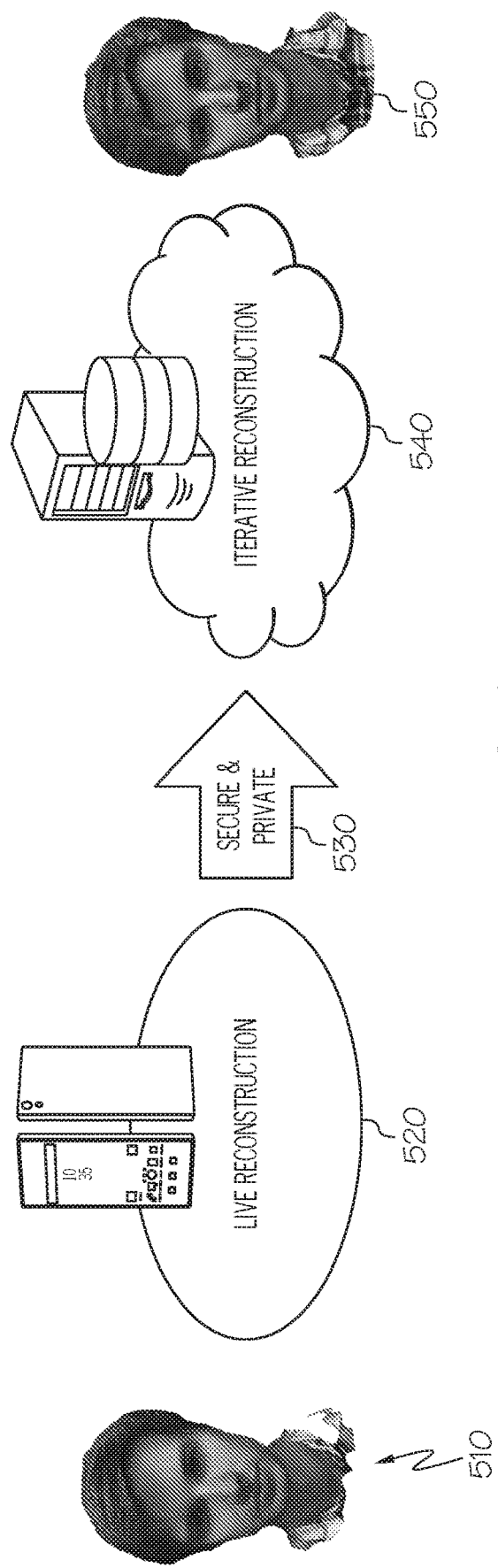
FIGS. 5 to 7 and FIG. 9 illustrate processing of 2D images to create 3D images, according to various embodiments described herein.

FIG. 5 illustrates processing of 2D images to create 3D images, which may represent a server pipeline for image processing. A subject 510, such as a human subject may be identified. A device such as a camera phone may be used to perform live reconstruction of the image, at 520. The live reconstruction may be saved in a secure and/or private memory, at 530. The secure and/or private memory may be associated with the camera phone or may be external to the camera phone. An iterative reconstruction process may be performed, at 540. A 3D image 550 may result from the operations described herein.

Figure 6:
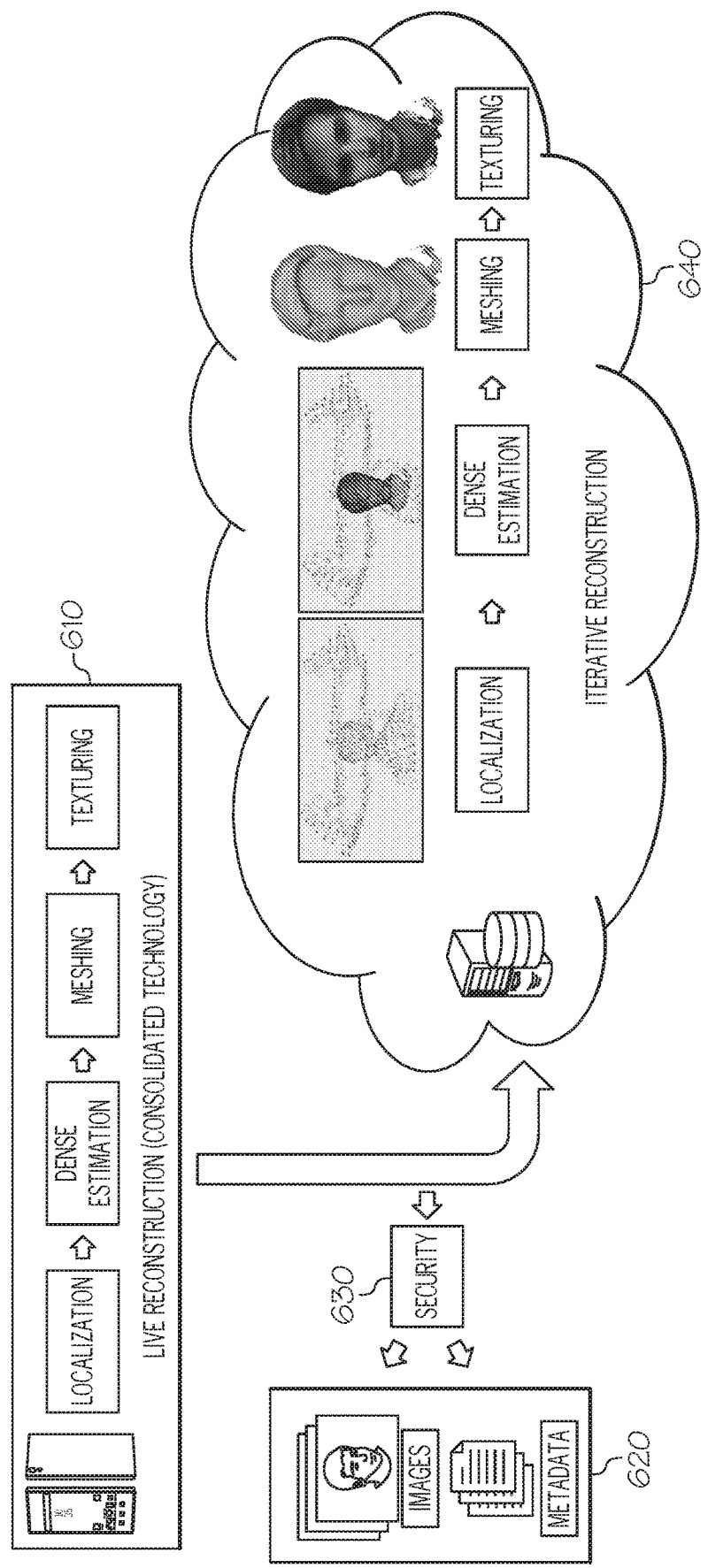

FIG. 6 provides further details of the operations of FIG. 5, according to various embodiments. Referring now to FIG. 6, live reconstruction 610 from 2D images captured by an image capturing device associated with a camera phone may include operations such as localization, dense estimation, meshing, and/or texturing that correspond to operations localization 204, dense estimation 205, meshing 206, and/or texturing 207 of FIG. 2. The images may be processed by security storage operations 630 such that images and/or metadata related to the images may be stored at 620. The metadata may include live reconstruction information and/or live estimation information related to the 3D, poses, and/or camera positions. This metadata may be used offline and/or or in further post-processing of the 2D images. In some embodiments, the images stored at 620 may include key frames that were identified from the 2D images captured by the camera phone. Key frames may be selected using a variety of techniques such as based on pose change, angular change, and/or based on matches between frames. Matches between frames may be quantified by a ratio of matching pixels between two images. Matching pixels may include correlating pixel characteristics such as intensity, color, contrast, resolution, and/or other characteristics of a digital image. Matches between frames will be further discussed below in the context of FIG. 7. A smaller ratio of matching pixels may indicate a greater change in the content of the two images, thus identifying the two images as key frames. Two images that have a significant number of matching pixels may be determined to be a match, and removed from consideration as a key frame. In other words, when there are not many matches between two images, a key frame may be identified. Further iterative reconstruction 640 operations may be performed on the key frames, 2D images, and/or metadata 620, as will be described further with respect to FIGS. 7 to 26.

Figure 7:
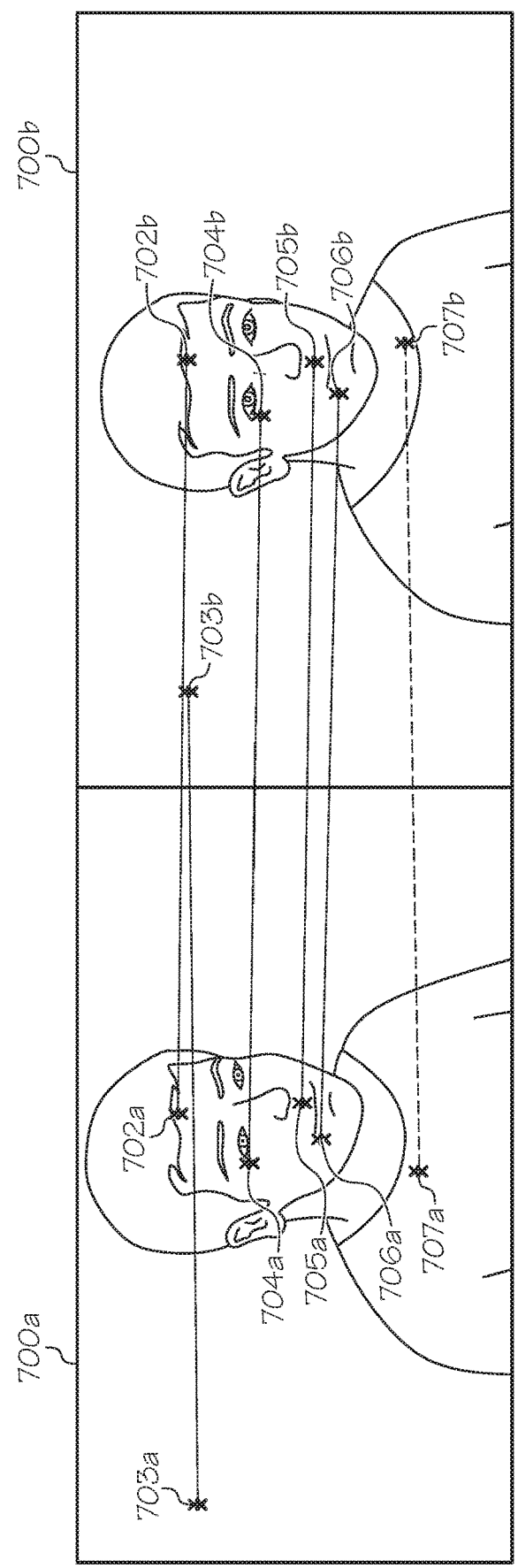

FIG. 7 illustrates two images captured by a camera at two different camera positions. Referring now to FIG. 7, image 700a was captured at slightly different orientation from image 700b. Corresponding image points, depicted by crosses, are identified in the 2D images, specifically image 700a and image 700b. For example, image point 702a may correspond to image point 702b, image point 703a may correspond to image point 703b, image point 704a may correspond to image point 704b, image point 705a may correspond to image point 705b, and/or image point 706a may correspond to image point 706b. Image points such as 703a/703b that are outside the key object (i.e. the person) in the image 700a/700b may be selected to aid in estimating the position of the key object. In other words, the points 703a/703b may be important for estimating the orientation of the camera when capturing the various images 700a/700b. Image points that are closer to the foreground (i.e. closer to the camera) may be more suitable for estimating the position of the object whereas points that are closer to the background (i.e. farther from the camera) may be more suitable for estimating the orientation of the object. Points 702a/702b to 706a/706b in the images 700a/700b may be selected based on being easier to match across multiple images. Some points such as 707a/707b may be outside the key object, i.e. the face of the person. They points 707a/707b may not be selected for use in the estimation of the position/orientation of the camera. In some embodiments, a joint relation of the 3D map and position/orientation of the camera may form a transformation from the 3D map to the 2D image. In such a case, a 3D point may be reprojected into the image frame.

Figure 8:
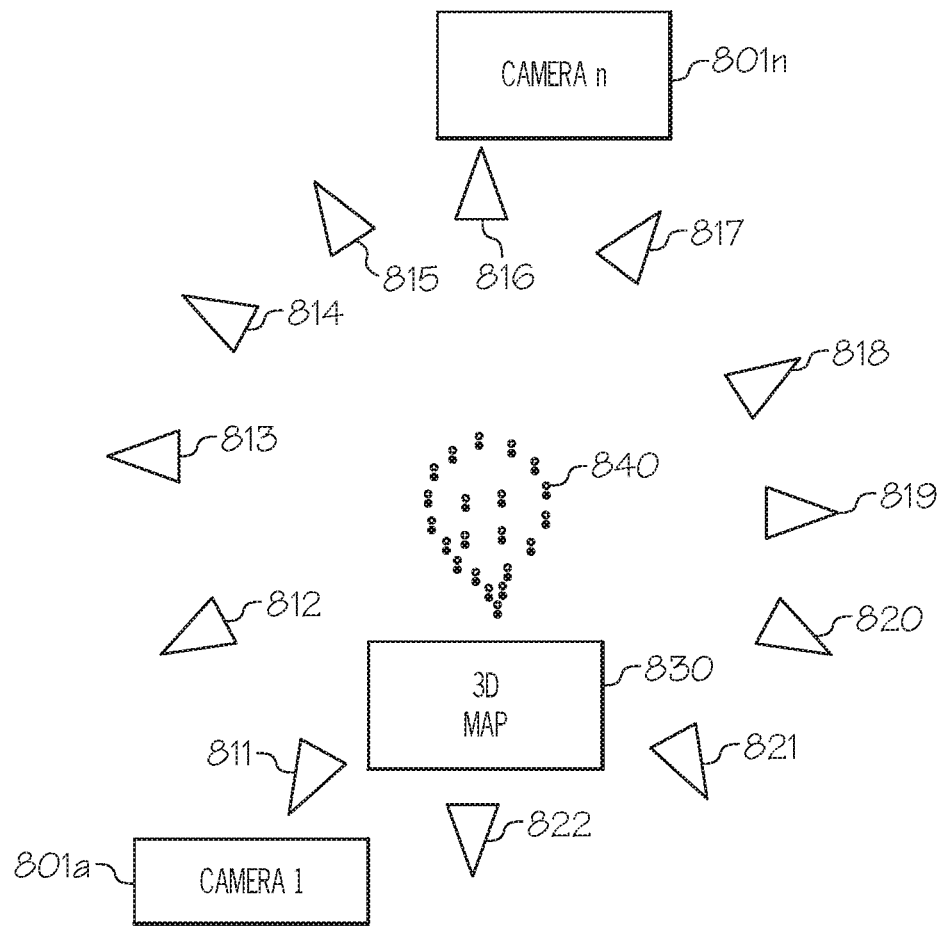
FIGS. 8 and 11 illustrate the capture of various 2D images, according to various embodiments described herein.

FIG. 8 is a diagram of various orientations of a camera that captures 2D images of an object. Referring to FIG. 8, orientations 811 to 822 around an object are shown. For example, camera 801a represents the camera at a location that captures the 2D image at orientation 811, and camera 801n represents the camera at a location that captures the 2D image at orientation 816. Estimation points 840 of the image may be used to form a 3D map 830. Estimation points 840 may be 3D estimates based on the various 2D images captured at various camera positions. In some embodiments, the plurality of poses may be oriented towards the 3D map.

Once a 3D map, such as the 3D map 830 of FIG. 8 is determined, a reprojection error of each 3D point from the 3D map 830 may be minimized or reduced. The reprojection error may be expressed in pixels and may correspond to a distance from a reprojected 3D point from the 3D map to the corresponding point position in the 2D image, such as image 700a/700b of FIG. 7. This distance may be measured in pixels or other appropriate measure for image processing. Due to lack of infinite precision in computer systems, a small error may exist, even if matches between images appear to be correct, such as for image points 702a/702b to 705a/705b of FIG. 7. However, some image points may include large errors due to incorrect matches, such as 706a/706b of FIG. 7.

Figure 9:
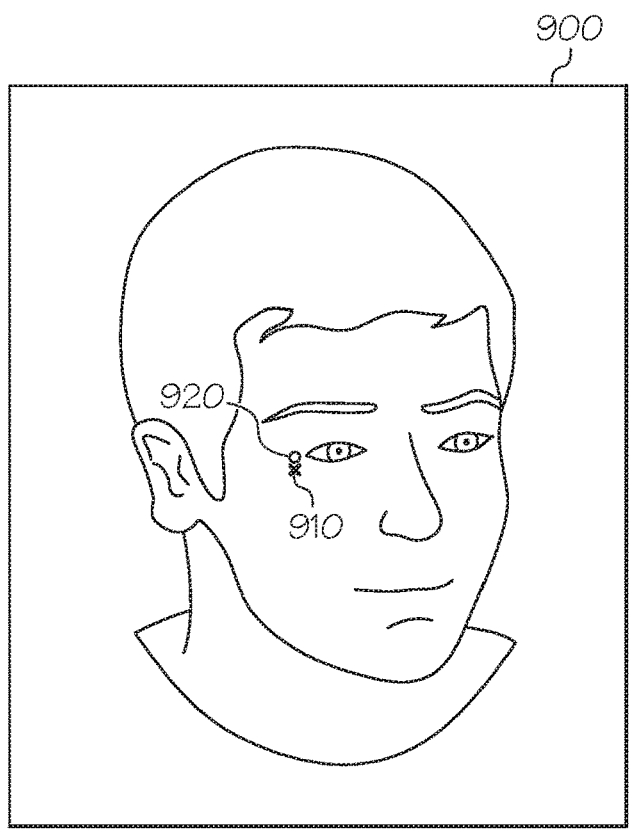

FIG. 9 illustrates a 2D image 900, such as image 700a/700b of FIG. 7. Referring now to FIG. 9, a reprojection point 910 is based on a 3D point from the 3D map and corresponds to a 2D point 920 in the 2D image 900. The 2D point 920 may be the original digitized 2D point from the original image 900. The use of the 3D points for reprojection may be a least square solution for the error. A least square solution may minimize the sum of the squares of the of the distance between reprojection points and original 2D points. A reprojection error between reprojection point 910 and 2D point 920 may correspond to the distance between reprojection point 910 and 2D point 920.

Figure 10:
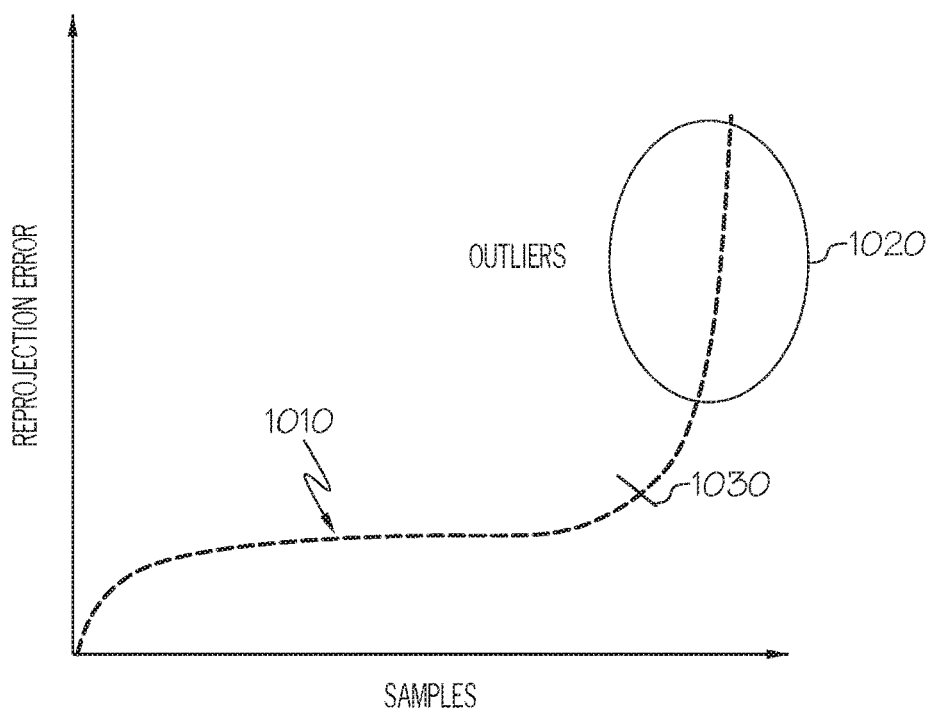
FIGS. 10 and 12 illustrate reprojection error for various 2D images, according to various embodiments described herein.

FIG. 10 illustrates reprojection errors for various 2D point samples and their corresponding reprojection points. Referring now to FIG. 10, the reprojection errors are shown for various sample reprojection points on a 2D image, such as 2D image 900 on FIG. 9. Some of the reprojection points may be outliers 1020 that are spaced a larger distance from the related 2D point, due to 3D drift, as will be discussed with respect to FIG. 11. A soft threshold 1030 on the curve 1010 separates the outliers may be determined. A soft threshold may be changed with each iteration of the global bundle adjustment. Use of a soft threshold may limit the impact of reprojection errors greater than the soft threshold value. A global bundle adjustment problem may be solved by minimizing the reprojection errors of estimations of various 3D points between different camera views. Curve 1010 of FIG. 10 represents this minimization where 2D points in the 2D image are associated with reprojection error. Due to the presence of these outliers 1020, robust statistics based weighting may be used. A "robust camera parameter", also referred to as a "robust statistic" or a "robust statistic parameter", may be used for weighting during bundle adjustment. Weighting of the reprojection points allows "down-weighting", i.e. providing less emphasis of reprojection points exhibiting higher error in iterative bundle adjustment. The robust statistic parameter may not be a threshold but may be a parameter used for the robust statistic parameter based weight computation.

Figure 11:
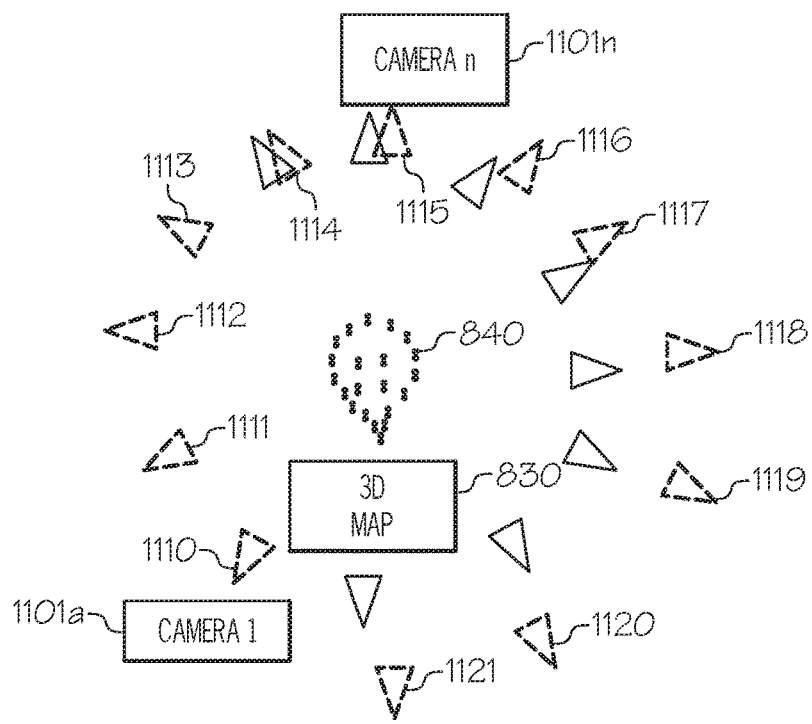

FIG. 11 is a diagram of various orientations of a camera that captures 2D images of an object. Referring to FIG. 11, actual/correct poses/orientations of the camera as well as the estimated live camera poses/orientations 1110-1121 are illustrated. A camera may be begin a scan at camera position 1101a and proceed around an object in the center of FIG. 11. Estimation points 840 of the image may be used to form a 3D map 830. Estimation points 840 may be based on the various 2D images captured at various camera positions 1101. 3D drift may occur in the 3D map and/or the camera position/orientation as the camera circles around the object, with the 3D drift gradually increasing with subsequent camera images. The estimation of the camera pose and/or orientation may change or drift from the actual pose and/or orientation. For example, the 3D drift at camera position 1101n may be higher at pose 1115 than pose 1110, as illustrated by a greater distance between the actual camera orientation and the live camera orientation. The highest amount of drift may be at a last camera position during capture of an image. Live camera orientation information and/or live reconstruction may be based on a live reconstruction initialization step and stored as metadata 620 of FIG. 6.

Figure 12:
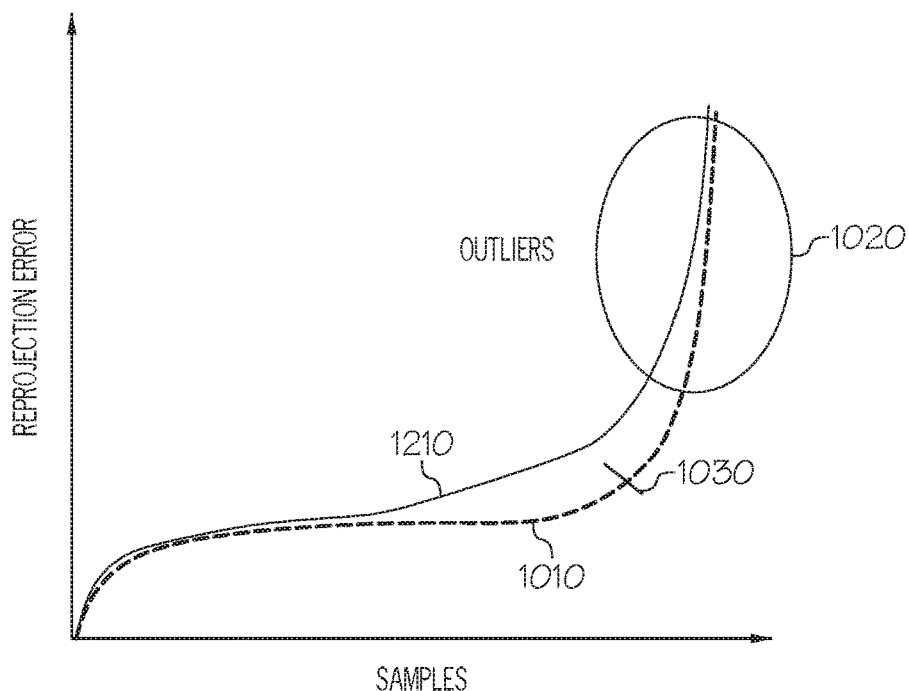

FIG. 12 illustrates reprojection errors for various reprojection points, with and without drift. Referring now to FIG. 12, curve 1010 represents the reprojection errors without the presence of drift. A soft threshold 1030 on the curve 1010 that separates the outliers 1020 may be determined. Curve 1210 represents reprojection errors in the presence of drift in the live scan. Cumulative error effects are evident in curve 1210 and may be difficult to remove during live processing since extensive iterative global bundle adjustments may be necessary to remove the cumulative error effects.

Iterative global bundle adjustment may reduce the cumulative error effects of drift, due to repetitive adjusting of the soft threshold, as will now be discussed. During iterative bundle adjustment, the soft threshold 1030 without the presence of drift in the live scan, which is used for determining the robust statistic parameter, may need to be increased in the presence of drift to limit the impact of reprojection errors. If the soft threshold 1030 is not adjusted from curve 1010 to curve 1210, the impact of the drift in the live image may not be reduced during the iterative bundle adjustment. If a lower value of soft threshold 1030 is selected in the presence of drift, fewer outliers 1020 may contribute to the bundle adjustment, providing a better estimation of the camera position/orientation. Better estimation of the camera position/orientation provides a more accurate 3D map and/or more accurate poses and reduces the 3D drift. However, if the soft threshold 1030 is selected to be higher, fewer outliers 1020 may be down-weighted in the bundle adjustment. Iterative bundle adjustment solutions may select a higher soft-threshold resulting in a higher robust statistic parameter, thus down-weighting fewer samples for a first iteration. The soft-threshold may be lowered on subsequent iterations, resulting in a lower robust statistic parameter for the subsequent iteration of the bundle adjustment. This process may be repeated for several iterations of the bundle adjustment. This lowering of the soft-threshold during subsequent iterations may reduce the error for the non-outlier samples. Since the reprojection error is reduced in the previous iteration, the subsequent iteration will not be down-weighted, even with a lower soft threshold. This may increase or keep stable the error for the outliers, i.e. down-weighting further in the next subsequent iteration. Therefore, the modification of the soft-threshold iteratively provides reduced reprojection errors, resulting in a better estimation of the 3D map and the poses.

Figure 13:
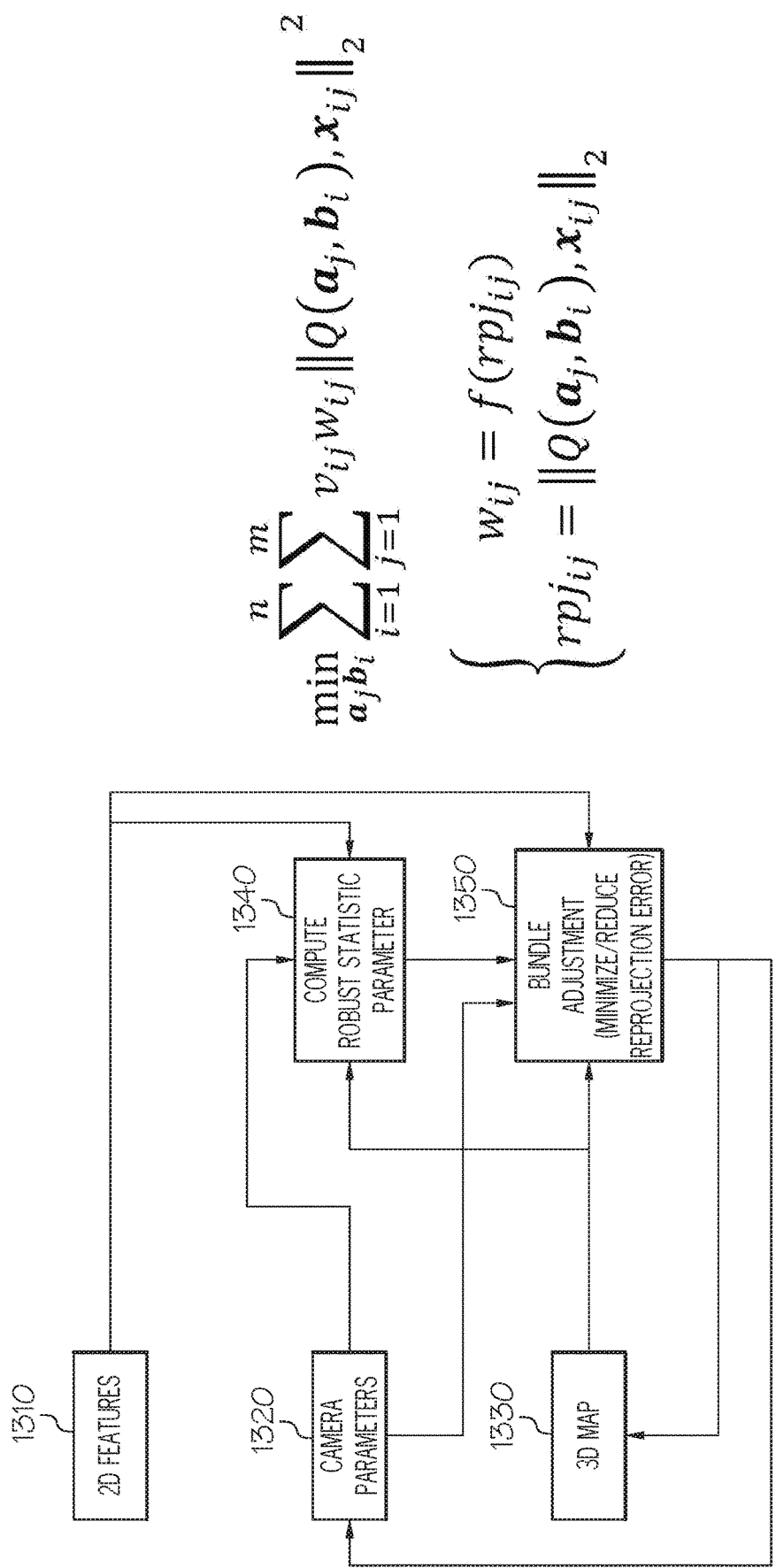
FIG. 13 illustrates a flowchart for estimation of a 3D map and a plurality of poses from a plurality of 2D images, according to various embodiments described herein.

FIG. 13 illustrates a flowchart for estimation of a 3D map and a plurality of poses from a plurality of 2D images, using iterative bundle adjustment. 2D features such as 2D points and poses/orientation may be determined at block 1310. A robust statistic parameter may be computed at block 1340. The robust statistic parameter and/or the robust statistic parameter may be determined based on the 2D features, other camera parameters, and/or the 3D map. Other camera parameters may be determined at block 1320. Bundle adjustment may be performed to minimize and/or reduce reprojection errors, at block 1350. Bundle adjustment may be performed based on the 2D features, a robust statistic parameter, other camera parameters, and or the 3D map from block 1330.

Bundle adjustment may be mathematically described in FIG. 13, as will be further discussed.

$$\min_{a_j b_i} \sum_{i=1}^{n} \sum_{j=1}^{m} v_{ij} w_{ij} \|Q(a_j, b_i), x_{ij}\|_2^2 \quad (1)$$

In equation (1), $x_{ij}$ are reprojection points, such as, for example reprojection point 910 of FIG. 9. $a_j$ represents the mapping function from a 3D coordinate into the image coordinates for j=1 . . . m. $b_i$ is a 3D map for i=1 . . . n. Equation 1 performs a minimization to try to minimize the sum of the reprojection errors by using $a_j$. It may be possible to map a 3D point $b_i$ of the map into the image j, represented by the function $(Q(a_j,b_i))$. The reprojection error may be a least square distance between the mapped 3D point and measurement $x_{ij}$, in pixel coordinates.

$$\begin{cases} w_{ij} = f(rpj_{ij}) \\ rpj_{ij} = \|Q(a_j, b_i), x_{ij}\|_2 \end{cases} \quad (2)$$

As shown in equation (2) $d(Q(a_j,b_i), x_{ij})^2 = rpj_{ij}$. Equation (1) introduces a weight $w_{ij}$ for every measurement $x_{ij}$. The weight $w_{ij}$ of the reprojection points allows "down-weighting", i.e. providing less emphasis of reprojection points exhibiting higher error in iterative bundle adjustment. Weight $w_{ij}$ may be based on a robust statistic. This weight $w_{ij}$ may be a function of the reprojection error $rpj_{ij}$ such that wij=f(rpj_ij) as in equation (2). In order to handle measurement outliers, robust statistics like Huber losses and/or Cauchy weights may be used. If the soft-threshold is higher, then the robust statistic parameter may also be higher. Using Cauchy weights, the robust statistic parameter may be represented as $\sigma$, such that the weights $w_{ij}$ are proportional to $1/(1+(rpj_{ij}/\sigma)^2)$, where $rpj_{ij}$ is the reprojection error. In some embodiments, based on Huber loss techniques, weight $w_{ij}$ may be quadratic for smaller values of $rpj_{ij}$ and linear for larger values of $rpj_{ij}$. Not all points of the image will be visible in all views. For example, a point on the tip of the nose of a person may not be visible for a camera view that is behind the head. $v_{ij}$ is used in equation (1) to account for points that may or may not be visible in an image. $v_{ij}$ denotes binary variables are equal 1 if point i is visible in the image j and 0, if point i is not visible in the image j. Reprojection errors will thus be "down-weighted" compared to use a simple least square minimization. The larger $rpj_{ij}$ values may correspond to outliers, as discussed with respect to FIGS. 10 and 12. Cauchy loss principles may be applied to determine weighting, according to some embodiments. Both Huber loss and Cauchy loss functions may have a parameter that corresponds to the soft threshold 1030 or FIGS. 10 and 12. Using Huber loss techniques, the soft threshold may correspond to a change from quadratic to linear. Using Cauchy loss techniques, a scalar parameter may be used to determine weighting.

An initial estimation of the position and/or orientation of the camera, aj, may be poor as a result of a higher degree of drift, as illustrated in FIG. 11. A poor initial estimation may correspond to a high $rpj_{ij}$ for measurements of a position and/or an orientation of the live camera pose/orientation with drift. In some embodiments, a robust statistic parameter corresponding to the drift may be assumed to be generally constant across various positions and may be selected to have a value of one to three times the mean/median reprojection error. In some embodiments, an iterative approach may be used to solve the bundle adjustment problem multiple times by changing the robust statistic parameter from a larger value to a smaller value, with each iteration, as described herein. The optimal robust statistic parameter may be estimated at subsequent iterations by sorting the reprojection errors $rpj_{ij}$ and then selecting the robust statistic parameter, for example, as a scalar, such as 3, times the median $rpj_{ij}$. The robust statistic parameter may be based on a change in the steepness and/or curvature of the reprojection error curve. Selecting the robust statistic parameter using the median and/or mean may correspond to the change in the curvature of the graphs of FIG. 10 or 12. Selecting the robust statistic parameter using the median and/or mean may have affect the curvature of the graph and/or the steepness of the graph. In some embodiments, the robust statistic parameter may be selected based on a change in the steepness of a curve corresponding to the reprojection errors may be determined based on the slope of the curve and/or an inflection point of the curve of FIG. 10 or 12.

Figure 14:
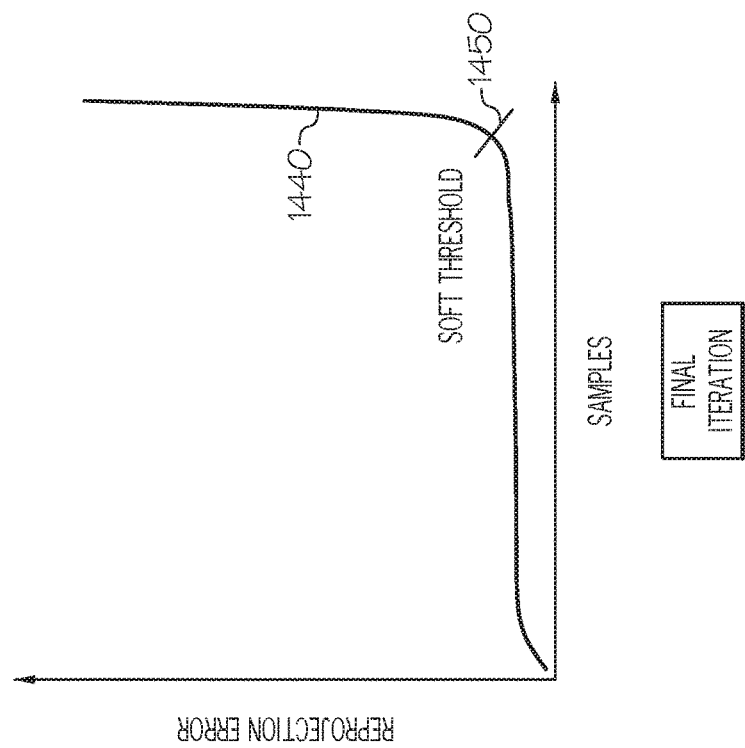
FIG. 14 illustrates iterative global bundle adjustment, according to various embodiments described herein.
Figure 14:
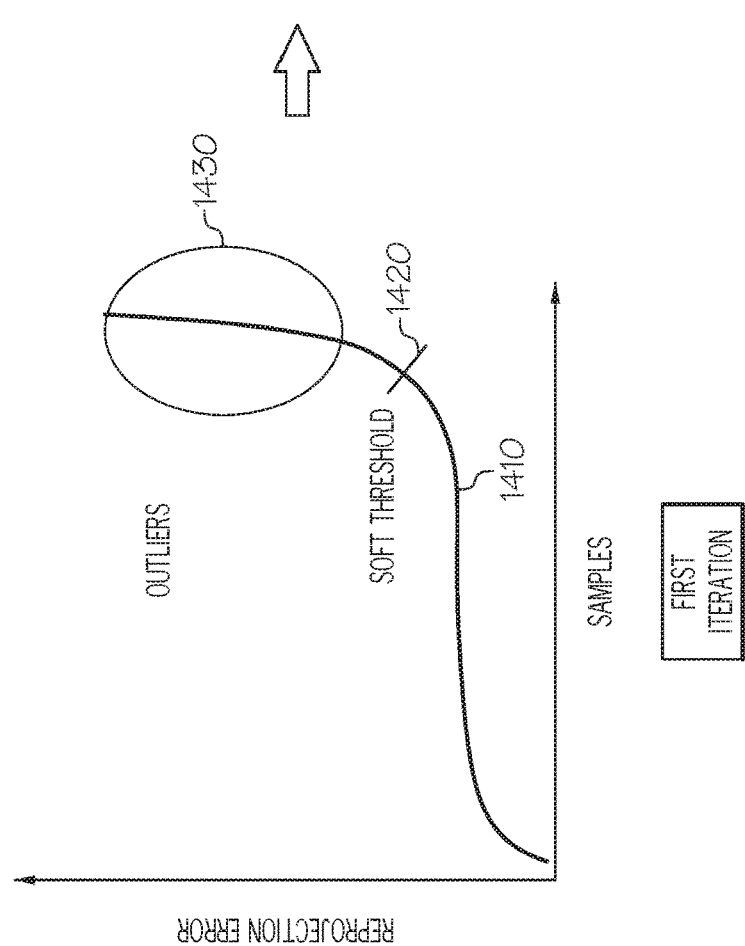

FIG. 14 illustrates iterative global bundle adjustment, according to various embodiments. The initialization of the 3D map and/or poses/orientations may correspond to a first iteration of the bundle adjustment. The reprojection errors may correspond to curve 1410 with outliers at 1430. A soft threshold 1420, which corresponds to the robust statistic parameter, may be selected to be at the soft threshold 1420 on curve 1410. Several iterations of bundle adjustment, such as ten iterations, may be performed, as described herein. With each bundle adjustment iteration, a check may be performed to ensure that the robust statistic parameter is smaller with each iteration, indicating that the reprojection error is converging. The final iteration of bundle adjustment may result in curve 1440, with a steeper curve as the bundle adjustment converges with a soft threshold 1450.

Figure 15:
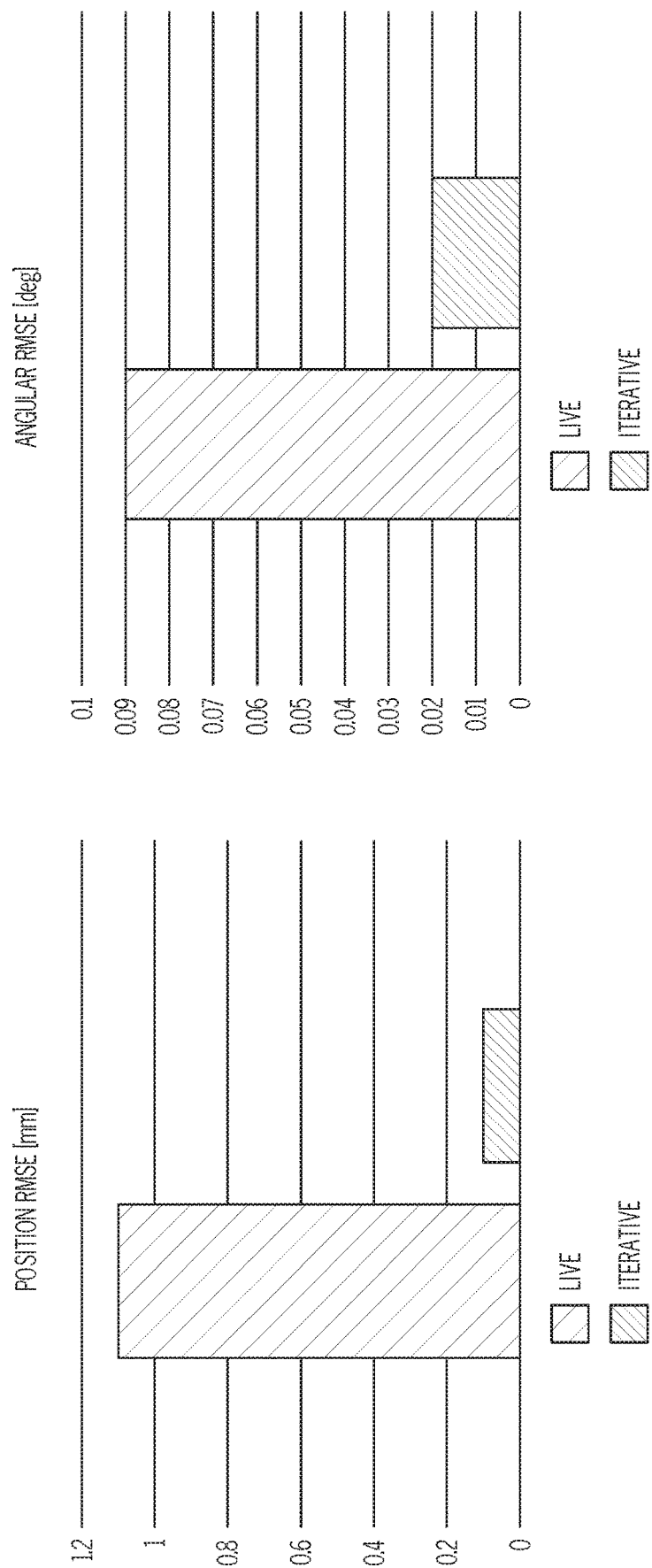
FIG. 15 is a graph showing localization results, according to various embodiments described herein.

FIG. 15 is a graph showing localization results with and without global bundle adjustment techniques, according to various embodiments. Referring to FIG. 15, estimation of the position of a 2D point may have a root mean square error (RMSE) over 1.0 mm for the live estimation, which may correspond to an initialization, as described herein. After performing one or more bundle adjustment iterations, root mean square error (RMSE) may reduce to around 0.1 mm. The angular root mean square error (RMSE) may be about 0.09 degrees for the live estimation, which may correspond to the initialization, whereas the mean square error (RMSE) may be about 0.02 degrees after performing one or more bundle adjustment iterations, as described herein.

Figure 16:
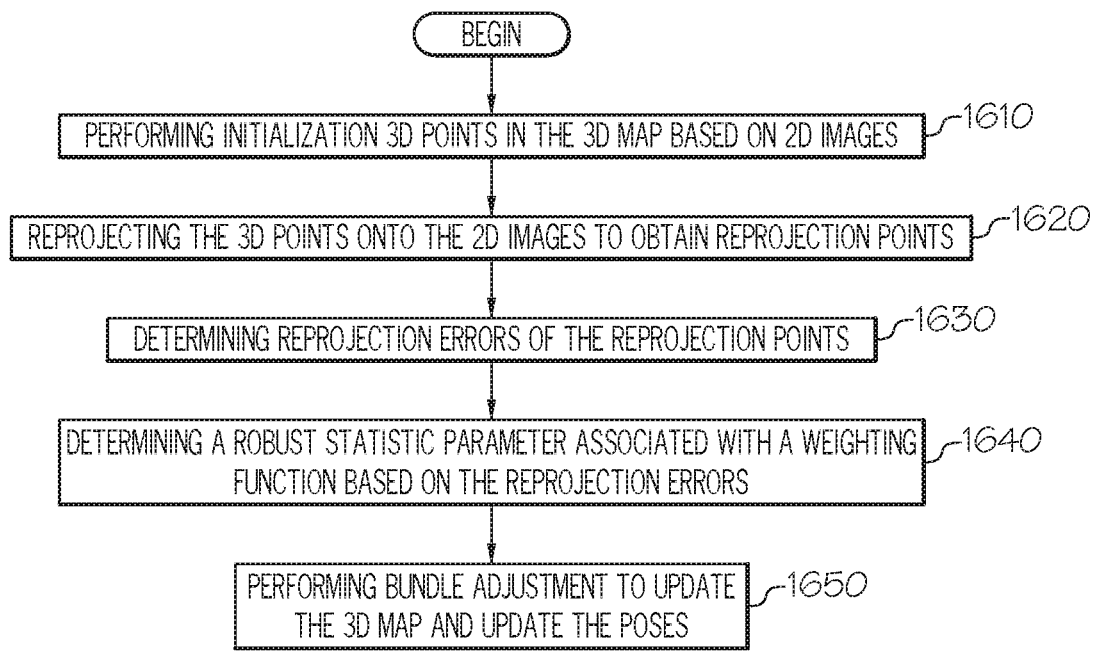
FIGS. 16 to 26 are flowcharts of operations for estimating a 3D map and/or poses, according to various embodiments described herein.

FIGS. 16 to 26 are flowcharts of operations for estimating a 3D map and/or poses, according to various embodiments described herein. Referring now to FIG. 16, an initialization of a plurality of 3D points in the 3D map based on the plurality of 2D images may be performed, at block 1610. The 3D points may be reprojected onto the 2D images to obtain reprojection points, at block 1620. Respective reprojection errors of the reprojection points may be determined, at block 1630. A robust statistic parameter associated with a weighting function may be determined based on the respective reprojection errors, at block 1640. Bundle adjustment may be performed on the 2D images to update the 3D map and update the plurality of poses, based on the robust statistic parameter and the weighting function, at block 1650. In some embodiments, operations may be performed to estimate at least one of focal length, skew, principal points, or distortion associated with the camera from the plurality of the 2D images. The position and orientation may be referred to as extrinsic parameters whereas the focal length, skew, principal points, and/or distortion may be referred to as intrinsic parameters. Bundle adjustment techniques may estimate not only a 3D map and the extrinsic parameters associated with the camera, such as position, orientation, and/or mapping from the 3D plane to the camera lens, but also the intrinsic parameters of the camera, which may include the mapping from the lens to the sensor. These intrinsic parameters may be estimated in advance, in some cases. Estimating intrinsic parameter in advance may not possible since pre-calibration of cameras such as those in mobile phones in advance may be difficult since factory tolerances in the production of the camera may be high. In cases where the intrinsic parameters have not been estimated in advance, the techniques described herein may be used to determine not only the extrinsic parameters associated with the camera, but also the intrinsic parameters associated with the camera.

Figure 17:
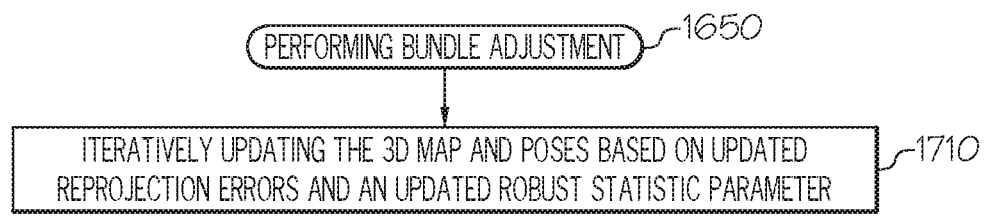

Referring now to FIG. 17, according to some embodiments, performing bundle adjustment at block 1650 may include iteratively updating the 3D map and the poses based on updated reprojection errors and an updated robust statistic parameter associated with an updated weighting function, at block 1710. The updated robust statistic parameter for a current iteration of the bundle adjustment may be different from the robust statistic parameter for a previous iteration of the bundle adjustment. In some embodiments, the updated robust statistic parameter is reduced with subsequent iterations of the bundle adjustment. If the updated robust statistic parameter is not reduced with each iteration of the bundle adjustment, the estimation of the 3D map may not converge.

Figure 18:
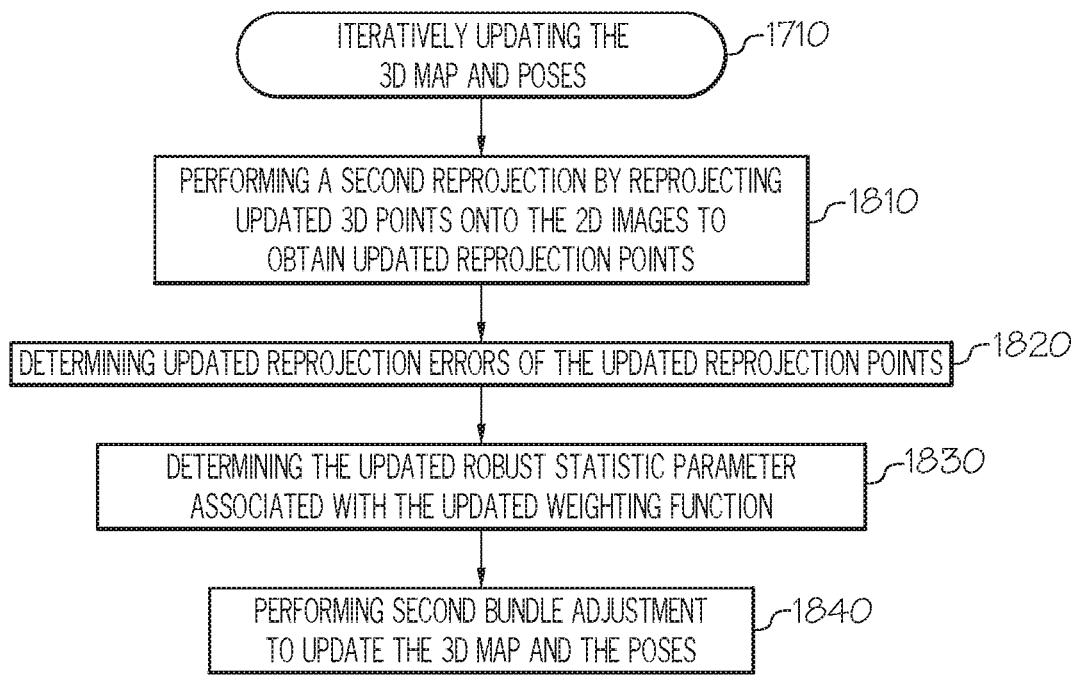

Referring now to FIG. 18, reprojecting ones of the 3D points may include a first reprojection, and the bundle adjustment may include a first bundle adjustment. Iteratively updating the 3D map and the plurality of poses of block 1710 may include performing a second reprojection by reprojecting the ones of updated 3D points onto ones of the 2D images to obtain updated reprojection points, at block 1810. Respective updated reprojection errors of ones of the updated reprojection points may be determined at block 1820. The updated robust statistic parameter associated with the updated weighting function may be determined based on the respective updated reprojection errors, at block 1830. A second bundle adjustment on the 2D images may be performed to update the 3D map and update the plurality of poses, based on the updated robust statistic parameter and the updated weighting function, at block 1840.

Figure 19:
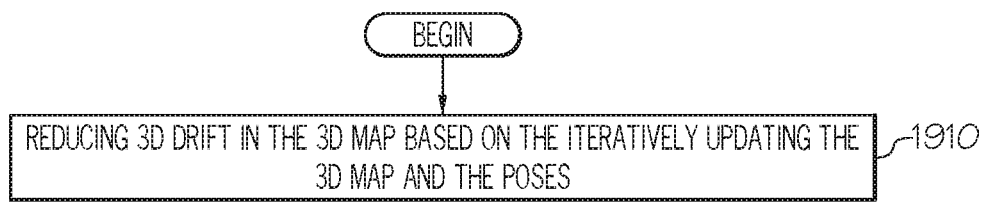
Figure 20:
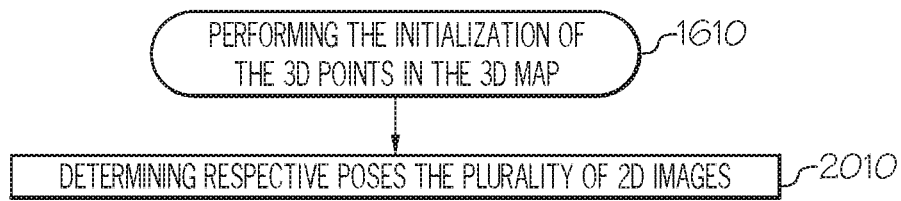

Referring now to FIG. 19, the 3D drift in the 3D map may be reduced based on iteratively updating the 3D map and the plurality of poses, at block 1910. Referring now to FIG. 20, performing the initialization of the plurality of 3D points in the 3D map at block 1610 may include determining respective poses of the plurality of poses for ones of the plurality of 2D images, at block 2010.

Figure 21:
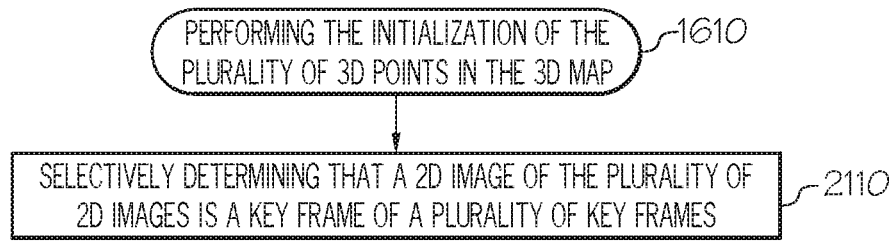
Figure 22:
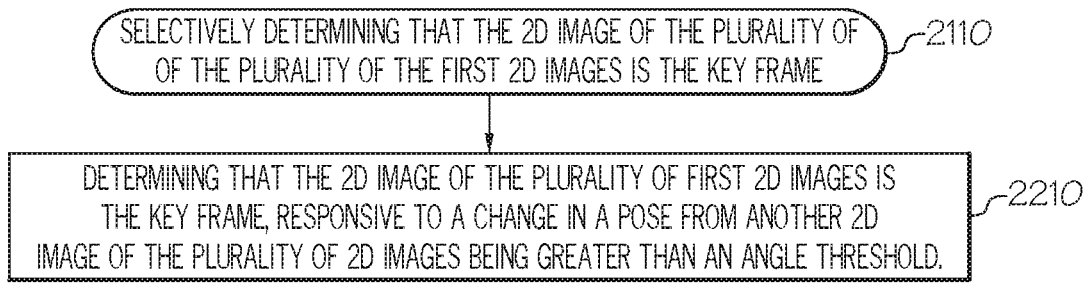

Referring now to FIG. 21, performing the initialization of the plurality of 3D points in the 3D map at block 1610 of FIG. 16 may include selectively determining that a 2D image of the plurality of 2D images is a key frame of a plurality of key frames, at block 2110. Referring now to FIG. 22, selectively determining that the 2D image of the plurality of first 2D images is the key frame of block 2110 may include determining that the 2D image of the plurality of first 2D images is the key frame, responsive to a change in a pose from another 2D image of the plurality of 2D images being greater than an angle threshold, at block 2210. The angle threshold may be an angle between changes in the poses, such as a change in angle of the face between FIG. 3B and FIG. 3C.

Figure 23:
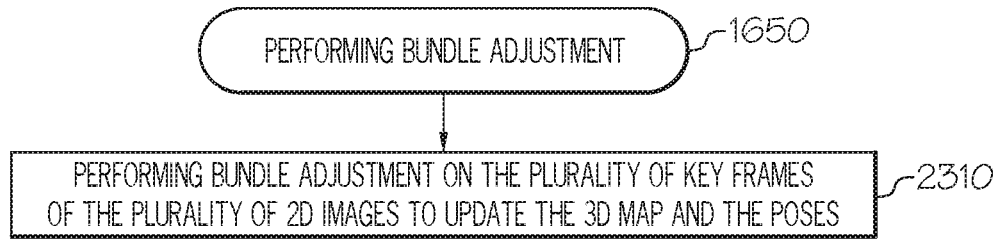

Referring now to FIG. 23, performing bundle adjustment at block 1650 may include performing bundle adjustment on the plurality of key frames of the plurality of 2D images to update the 3D map and update the plurality of poses, at block 2310. The respective reprojection errors may include respective distances of respective reprojection points to corresponding 2D points in ones of the 2D images.

Figure 24:
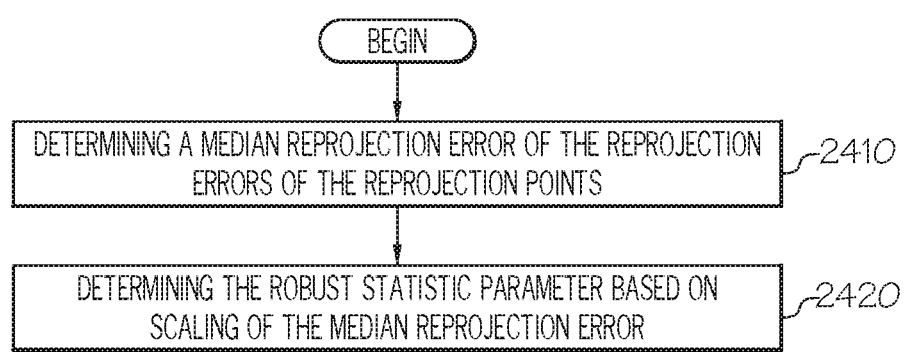

Referring now to FIG. 24, a median and/or mean reprojection error of the reprojection errors of the reprojection points may be determined, at block 2410. The robust statistic parameter may be determined based on scaling of the median and/or mean reprojection error, at block 2420. Advantages of determining the robust statistic parameter based scaling the median or mean provides accurate estimation of various points in the 3D map and/or estimations of poses/orientation, which are important for 3D image generation. The robust statistic parameter is used to iteratively adjust the weighting function to reduces errors of reprojection points that are reprojected onto the 2D images. This reduction of reprojection errors has the advantage of improving the overall resulting 3D image that is based on the plurality of 2D images. The weighting function selectively provides a greater weight to a second one of the reprojection points than to a first one of the reprojection points, responsive to a first reprojection error associated with the first one of the reprojection points being greater than a second reprojection error associated with the second one of the reprojection points. A change in the steepness of a curve corresponding to the reprojection errors, such as in FIG. 14, may be used as a threshold for the bundle adjustment. The threshold for bundle adjustment operations may be inferred from sorted reprojection error values. In some embodiments, the robust statistic parameter may be selected based on a change in the steepness of a curve corresponding to the reprojection errors may be determined based on the slope of the curve and/or an inflection point of the curve of FIG. 10 or 12.

Figure 25:
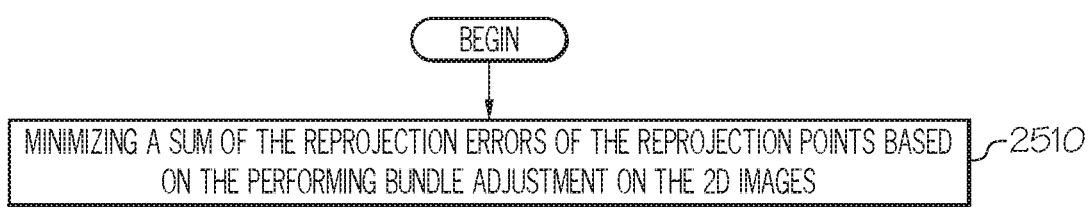
Figure 26:
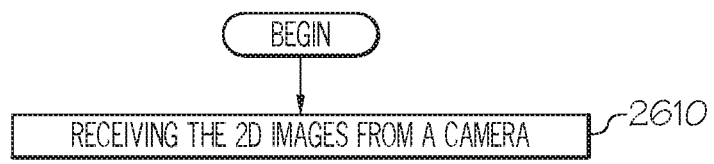

Referring now to FIG. 25, a sum of the reprojection errors of the reprojection points may be minimized based on performing bundle adjustment on the 2D images, at block 2510. Minimization may be performed by iteratively reducing the reprojection errors, as described in various embodiments. The weighting function may be of a quadratic function form for first ones of the reprojection errors that are less than a threshold reprojection error. The weighting function may be of a linear function form for second ones of the reprojection errors that are greater than the threshold reprojection error. In some embodiments, one of the Huber weight or the Cauchy be may considered, but not the other. In some embodiments, the Huber weight and the Cauchy weight may be considered in conjunction with one another. Referring now to FIG. 26, the 2D images may be received from a camera, at block 2610.

Figure 27:
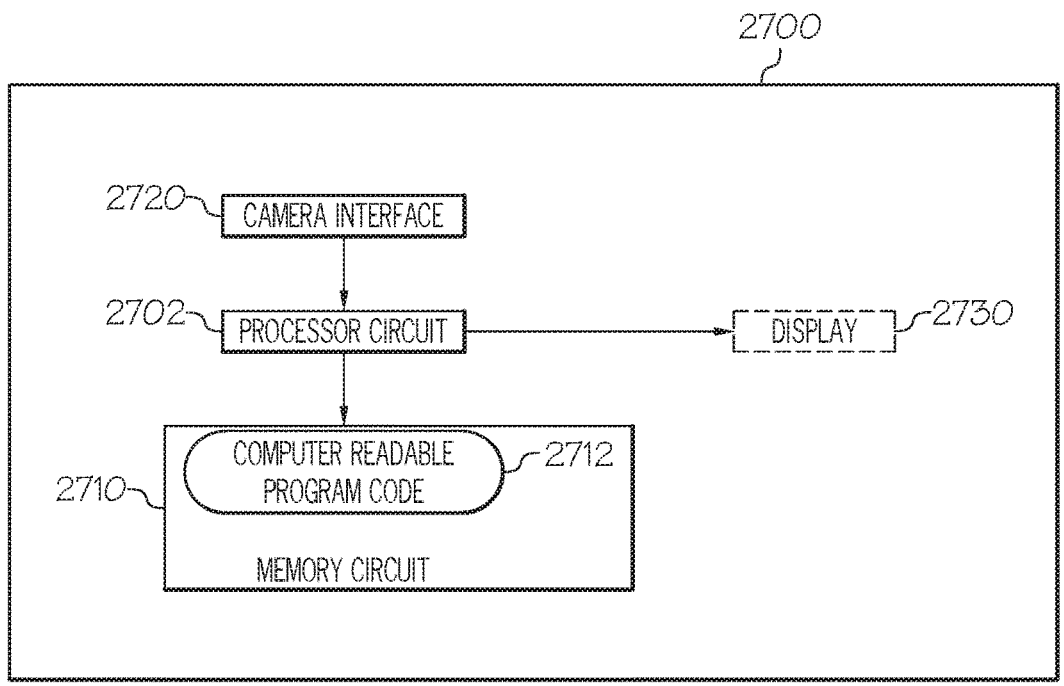
FIGS. 27 and 28 are block diagrams of wireless electronic devices, according to various embodiments described herein.

FIG. 27 is a block diagram of an image processing system 2700 of an electronic device, such as camera 100 of FIG. 1. The image processing system 2700 may be integrated with the camera 100 and/or may be external to the camera 100 and is configured to perform operations according to one or more embodiments disclosed herein. Referring to FIG. 27, the image processing system 2700 includes a display 2730, a processor circuit 2702, and a memory circuit 2710 containing computer readable program code 2712. Display 2730 may include a display circuit, display driver, and/or a screen for display/viewing of 2D and/or 3D images. The processor circuit 2702 may include one or more data processing circuits, such as a general purpose and/or special purpose processor, e.g., microprocessor and/or digital signal processor, which may be collocated or distributed across one or more networks. The processor circuit 2702 is configured to execute the computer readable program code 2712 in the memory 2710 to perform at least some of the operations and methods of described herein as being performed by the image processing module 2700. A camera interface 2720 is coupled to the processor circuit 2702 and may communicate with a server or other external network entity, directly or indirectly.

Figure 28:
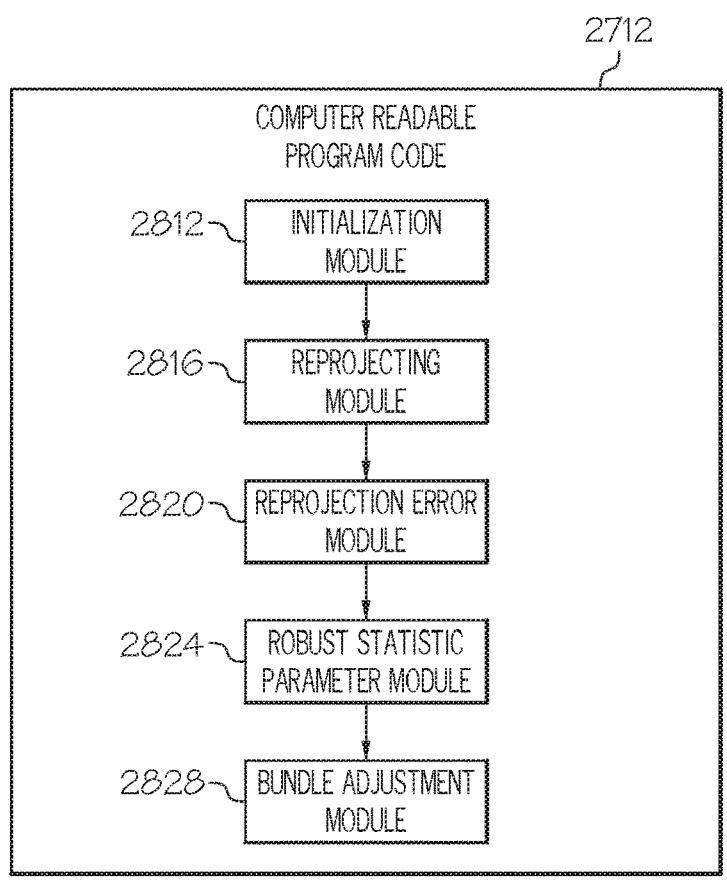

FIG. 28 illustrates modules for an image processing module that perform operations as disclosed herein according to some embodiments. The computer readable program code 2712 of FIG. 27 may include one or more modules. Referring now to FIG. 28, the computer readable program code 2712 may include an initialization module 2812, a reprojecting module 2816, reprojection error module 2820, robust statistic parameter module 2824, and a bundle adjustment module 2828. The initialization module 2812 is for performing an initialization of a plurality of 3D points in the 3D map based on the plurality of 2D images (block 1610 of FIG. 16). The reprojecting module 2816 is for reprojecting ones of the 3D points onto ones of the 2D images to obtain reprojection points (block 1620 of FIG. 16). The reprojection error module 2820 is for determining respective reprojection errors of ones of the reprojection points (block 1630 of FIG. 16). The robust statistic parameter module 2824 is for determining a robust statistic parameter associated with a weighting function based on the respective reprojection errors (block 1640 of FIG. 16). The bundle adjustment module 2828 is for performing bundle adjustment on the 2D images to update the 3D map and update the plurality of poses, based on the robust statistic parameter and the weighting function (block 1650 of FIG. 16). The modules 2812, 2816, 2820, 2824, and 2828 may perform other corresponding operations and methods disclosed herein.

Various embodiments presented herein have described estimating a 3D map and poses based on 2D images. Specifically, solutions to improve the estimation of the 3D map by iteratively applying bundle adjustment to update the 3D map and the poses by adjusting a robust statistic parameter used in relation to a weighting function have been described. Although the embodiments described herein have been in the context of a mobile camera, these techniques may be applied to other imaging systems such as security cameras, medical imaging, etc.

Further Embodiments

In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art, and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-eRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present disclosure may be embodied in hardware and/or in software (including firmware, resident software, microcode, etc.) that runs on a processor such as a digital signal processor, which may collectively be referred to as "circuitry," "a module" or variants thereof.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination. Many variations and modifications can be made to the embodiments without substantially departing from the principles described herein. All such variations and modifications are intended to be included herein within the scope.

The invention claimed is:

1. A method for estimation of a Three-Dimensional, 3D, map and a plurality of poses from a plurality of Two-Dimensional, 2D, images, the method comprising:
   performing an initialization of a plurality of 3D points in the 3D map based on the plurality of 2D images;
   reprojecting ones of the 3D points onto ones of the 2D images to obtain reprojection points;

determining respective reprojection errors of ones of the reprojection points;

determining a change in steepness of a curve corresponding to the reprojection errors and/or a median and/or mean reprojection error of the reprojection errors of the reprojection points;

determining a robust statistic parameter associated with a weighting function based on the respective reprojection errors, wherein the robust statistic parameter is determined based on the change in steepness of the curve corresponding to the reprojection errors and/or a scaling of the median and/or mean reprojection error; and performing bundle adjustment to update the 3D map and/or update the plurality of poses, based on the robust statistic parameter and the weighting function, wherein the performing bundle adjustment comprises iteratively updating the 3D map and the plurality of poses based on updated reprojection errors and an updated robust statistic parameter associated with an updated weighting function.

2. The method of claim 1, wherein the updated robust statistic parameter for a current iteration of the bundle adjustment is different from the robust statistic parameter for a previous iteration of the bundle adjustment.

3. The method of claim 1, wherein the updated robust statistic parameter is reduced with subsequent iterations of the bundle adjustment.

4. The method of claim 1, wherein the reprojecting ones of the 3D points comprises a first reprojection, wherein the bundle adjustment comprises a first bundle adjustment, and wherein the iteratively updating the 3D map and the plurality of poses comprises:

performing a second reprojection by reprojecting the ones of updated 3D points onto ones of the 2D images to obtain updated reprojection points;

determining respective updated reprojection errors of ones of the updated reprojection points;

determining the updated robust statistic parameter associated with the updated weighting function based on the respective updated reprojection errors; and performing a second bundle adjustment to update the 3D map and update the plurality of poses, based on the updated robust statistic parameter and the updated weighting function.

5. The method of claim 1, further comprising:

reducing 3D drift in the 3D map and/or the plurality of poses based on the iteratively updating the 3D map and the plurality of poses.

6. The method of claim 1, wherein the performing the initialization of the plurality of 3D points in the 3D map comprises:

determining respective poses of the plurality of poses for ones of the plurality of 2D images.

7. The method of claim 1, wherein the performing the initialization of the plurality of 3D points in the 3D map comprises:

selectively determining that a 2D image of the plurality of 2D images is a key frame of a plurality of key frames.

8. The method of claim 7, wherein the selectively determining that the 2D image of the plurality of 2D images is the key frame comprises determining that the 2D image of the plurality of 2D images is the key frame, responsive to a change in a pose from another 2D image of the plurality of 2D images being greater than an angle threshold, and wherein the performing bundle adjustment comprises performing bundle adjustment on the plurality of key frames of the plurality of 2D images to update the 3D map and update the plurality of poses.

9. The method of claim 1, further comprising:

estimating at least one of focal length, skew, principal points, or distortion from the plurality of the 2D images.

10. The method of claim 1, wherein the respective reprojection errors comprise respective distances of respective reprojection points to corresponding 2D points in ones of the 2D images.

11. The method of claim 1, wherein the weighting function selectively provides a greater weight to a second one of the reprojection points than to a first one of the reprojection points, responsive to a first reprojection error associated with the first one of the reprojection points being greater than a second reprojection error associated with the second one of the reprojection points.

12. The method of claim 1, further comprising:

minimizing a sum of the reprojection errors of the reprojection points based on the performing bundle adjustment.

13. The method of claim 1, wherein the weighting function comprises a quadratic function for first ones of the reprojection errors that are less than a threshold reprojection error, and wherein the weighting function comprises a linear function for second ones of the reprojection errors that are greater than the threshold reprojection error.

14. The method of claim 1, further comprising:

receiving the 2D images from a camera.

15. A computer program product for operating an image capturing system, the computer program product comprising a non-transitory computer readable storage medium having computer readable program code embodied in the medium that when executed by a processor causes the processor to perform the method of claim 1.

16. An imaging system for processing images, the imaging system comprising:

a processor; and a memory coupled to the processor and storing computer readable program code that when executed by the processor causes the processor to perform operations comprising:

performing an initialization of a plurality of 3D points in a 3D map based on a plurality of 2D images;

reprojecting ones of the 3D points onto ones of the 2D images to obtain reprojection points;

determining respective reprojection errors of ones of the reprojection points;

determining a change in steepness of a curve corresponding to the reprojection errors and/or a median and/or mean reprojection error of the reprojection errors of the reprojection points;

determining a robust statistic parameter associated with a weighting function based on the respective reprojection errors, wherein the robust statistic parameter is determined based on the change in steepness of the curve corresponding to the reprojection errors and/or a scaling of the median and/or mean reprojection error; and performing bundle adjustment to update the 3D map and update the plurality of poses, based on the robust statistic parameter and the weighting function, wherein the performing bundle adjustment comprises iteratively updating the 3D map and the plurality of poses based on updated reprojection errors and an updated robust statistic parameter associated with an updated weighting function.

17. The image processing system of claim 16, wherein the updated robust statistic parameter for a current iteration of the bundle adjustment is different from the robust statistic parameter for a previous iteration of the bundle adjustment.

* * * * *